(12) United States Patent
Frigo et al.

(10) Patent No.: US 7,933,940 B2
(45) Date of Patent: Apr. 26, 2011

(54) CYCLIC SEGMENTED PREFIX CIRCUITS FOR MESH NETWORKS

(75) Inventors: Matteo Frigo, Austin, TX (US); Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1347 days.

(21) Appl. No.: 11/408,099

(22) Filed: Apr. 20, 2006

(65) Prior Publication Data
US 2007/0260663 A1 Nov. 8, 2007

(51) Int. Cl.
*G06F 15/00* (2006.01)
(52) U.S. Cl. ........................... 708/200; 708/710
(58) Field of Classification Search .............. 708/200, 708/710, 713
See application file for complete search history.

(56) References Cited

U.S. PATENT DOCUMENTS

| | | | |
|---|---|---|---|
| 5,333,268 A | 7/1994 | Douglas et al. | |
| 5,999,961 A | * 12/1999 | Manohar et al. | ............... 708/505 |
| 6,038,657 A | 3/2000 | Favor et al. | |
| 6,609,189 B1 | 8/2003 | Kuszmaul et al. | |

OTHER PUBLICATIONS

Blelloch, Guy E., "Scans as Primitive Parallel Operations," IEEE Trans. on Computers C-38(11):1526-1538, Nov. 1989.
Blelloch, Guy E., "Prefix Sums and Their Applications," Technical Report CMU-CS-90-190, School of Computer Science, Carnegie Mellon University, Pittsburgh, PA 15213, Nov. 1990.
Leiserson, Charles E. et al., "The Network Architecture of the Connection Machine CM-5," J. of Parallel and Distributed Computing, 33(2):145-158, Mar. 1996.
Eğecioğlu, Ömer et al., "Optimal Parallel Prefix on Mesh Architectures," Parallel Algorithms and Applications, I:191-209, 1993.
Henry, Dana S. et al., "Cyclic Segmented Prefix Circuits," Ultrascalar Memo 1, Yale University, Nov. 1998.
Henry, Dana S. et al., "Circuits for Wide-Window Superscalar Processors," In 27th International Symposium on Computer Architecture, pp. 236-247, Vancouver, British Columbia, Jun. 2000.
Henry, Dana S. et al., "The Ultrascalar Processor—An Asymptotically Scalable Superscalar Microarchitecture," In 20th Anniversary Conference on Advanced Research in VLSI, pp. 256-273, Atlanta, GA, Mar. 1999.
Ladner, Richard E., "Parallel Prefix Computation," J. of the ACM, 27(4):831-838, Oct. 1980.
Pippenger, Nicholas, "The Complexity of Computations by Networks," IBM J. of Research and Development, 31(2):235-243, Mar. 1987.
Cormen, Thomas H. et al., "Introduction to Algorithms," MIT Press, 1990, p. 726, Exercise 30-1.
Leighton, F. Thomas. Introduction to Parallel Algorithms and Architectures: Arrays, Trees, Hypercubes. Morgan Kaufmann 1992, pp. 37-44.

* cited by examiner

*Primary Examiner* — Chuong D Ngo
(74) *Attorney, Agent, or Firm* — Garg Law Firm, PLLC; Rakesh Garg; Libby Z. Toub

(57) ABSTRACT

Parallel prefix circuits for computing a cyclic segmented prefix operation with a mesh topology are disclosed. In one embodiment of the present invention, the elements (prefix nodes) of the mesh are arranged in row-major order. Values are accumulated toward the center of the mesh and partial results are propagated outward from the center of the mesh to complete the cyclic segmented prefix operation. This embodiment has been shown to be time-optimal. In another embodiment of the present invention, the prefix nodes are arranged such that the prefix node corresponding to the last element in the array is located at the center of the array. This alternative embodiment is not only time-optimal when accounting for wire-lengths (and therefore propagation delays), but it is also asympotically optimal in terms of minimizing the number of segmented prefix operators.

16 Claims, 37 Drawing Sheets

$s$ [1 0 0 0 0 0 0] [1 0] [1 0 0] [1 0] [1 0]

$a$  2 7 1 1 3 5 2 4 5 3 1 4 3 2 2 4

$b$ [2 9 10 11 | 14 19 21 4 | 9 3 4 8 | 3 5 2 6]

row 0  row 1  row 2  row 3

Figure 10

| | | | | | | | | | | | | | | | |
|---|---|---|---|---|---|---|---|---|---|---|---|---|---|---|---|
| $s$ | 0 | 0 | 0 | 0 | 0 | 0 | 0 | 1 | 0 | 1 | 0 | 0 | 1 | 0 | 1 | 0 |
| $a$ | 2 | 7 | 1 | 1 | 3 | 5 | 2 | 4 | 5 | 3 | 1 | 4 | 3 | 2 | 2 | 4 |
| $b$ | 8 | 15 | 16 | 17 | 20 | 25 | 27 | 4 | 9 | 3 | 4 | 8 | 3 | 5 | 2 | 6 | row 0        row 1        row 2        row 3

Figure 14

| $k$ | 0 | 1 | 2 | 3 | 4 | 5 | 6 | 7 |
|---|---|---|---|---|---|---|---|---|
| $s$ | 0 | 1 | 0 | 0 | 0 | 0 | 0 | 0 |
| $a$ | 1 | 1 | 1 | 1 | 1 | 1 | 1 | 1 |
| $b'$ | 1 | 1 | 2 | 3 | 4 | 5 | 6 | 7 |
| $b$ | 8 | 1 | 2 | 3 | 4 | 5 | 6 | 7 |

Figure 19

| $k$  | 0 | 1 | 2 | 3 | 4 | 5 | 6 | 7 |
|------|---|---|---|---|---|---|---|---|
| $s$  | 0 | 0 | 0 | 0 | 0 | 0 | 0 | 1 |
| $a$  | 1 | 1 | 1 | 1 | 1 | 1 | 1 | 1 |
| $b'$ | 1 | 2 | 3 | 4 | 5 | 6 | 7 | 1 |
| $b$  | 2 | 3 | 4 | 5 | 6 | 7 | 8 | 1 |

Figure 20

|   |   |   |   |   |
|---|---|---|---|---|
| 0  | 1  | 4  | 3  | 2  |
| 5  | 6  | 9  | 8  | 7  |
| 20 | 21 | 24 | 23 | 22 |
| 15 | 16 | 19 | 18 | 17 |
| 10 | 11 | 14 | 13 | 12 |

CYCLIC SEGMENTED PREFIX CIRCUITS FOR MESH NETWORKS

STATEMENT OF GOVERNMENT FUNDING

This invention was made with Government support under DARPA, NBCH3039004. THE GOVERNMENT HAS CERTAIN RIGHTS IN THIS INVENTION.

BACKGROUND OF THE INVENTION

1. Technical Field

The present invention relates generally to circuits for parallel computation. Specifically, the present invention provides a mesh topology for computing time- and wire-length-optimal cyclic segmented parallel prefix operations.

2. Description of the Related Art

Parallel prefix circuits have evolved as a generalization of efficient algorithms for binary arithmetic. Ladner and Fischer introduced parallel prefix computations as a class of parallel algorithms. Ladner, R. E. et al. "Parallel Prefix Computation," *J. of the ACM,* 27(4):831-838, October 1980. See also Pippenger, N. "The Complexity of Computations by Networks," *IBM J. of Research and Development,* 31(2):235-243, March 1987; Blelloch, G. E. "Scans as Primitive Parallel Operations," *IEEE Trans. On Computers,* C-38(11):1526-1538, November 1989; Blelloch, G. E. "Prefix Sums and their Applications," Technical Report CMU-CS-90-190, School of Computer Science, Carnegie Mellon University, Pittsburgh, Pa. 15213, November 1990; Leighton, F. T. *Introduction to Parallel Algorithms and Architectures: Arrays, Trees, Hypercubes,* Morgan Kaufmann, 1992; and Cormen, Leiserson, and Rivest. *Introduction to Algorithms,* MIT Press 1990. Parallel prefix circuits were implemented in Thinking Machine's CM-5 supercomputer. See Leiserson, C. E. et al. "The Network Architecture of the Connection Machine CM-5," *J. of Parallel and Distributed Computing,* 33(2):145-158, March 1996; U.S. Pat. No. 5,333,268 (DOUGLAS et al.) 1994-07. The Ultrascalar processor is based on the observation that cyclic segmented parallel prefix circuits can implement all the tasks of a typical superscalar processor, including register renaming, wake-up, scheduling, committing, etc., in an orderly, principled fashion. See Henry, D. S. et al. "Cyclic Segmented Prefix Circuits," Ultrascalar Memo 1, Yale University, November 1998; Henry, D. S. et al. "The Ultrascalar Processor—An Asymptotically Scalable Superscalar Microarchitecture," in 20*th Anniversary Conference on Advanced Research in VLSI,* pp. 256-278, Atlanta, Ga., March 1999; Henry, D. S. et al. "Circuits for Wide-Window Superscalar Processors," in 27*th Int'l Symposium on Computer Architecture,* pp. 236-247, Vancouver, BC, June 2000; U.S. Pat. No. 6,609,189 (KUSZMAUL et al.) 2003-08. Parallel prefix circuits have also been applied to load/store disambiguation, although under the name scan circuit. See U.S. Pat. No. 6,038,657 (FAVOR et al.) 2000-03.

Much of the appeal of parallel prefix computations stems from the fact that they can be implemented as a tree structure in VLSI with logarithmic complexity. Traditionally, complexity theory accounts for the number of nodes in the tree-structured circuit rather than the length of the wires. With increasing clock speeds, the lengths of the wires begin to dominate the critical path length, however.

What is needed, therefore, is a circuit topology for computing a cyclic segmented parallel prefix operation that is time-optimal as well as being optimal in terms of wire lengths and propagation delays. The present invention provides a solution to these and other problems, and offers other advantages over previous solutions.

SUMMARY OF THE INVENTION

Accordingly, the present invention provides new parallel prefix circuits for computing a cyclic segmented prefix operation with a mesh topology. In one embodiment of the present invention, the elements (prefix nodes) of the mesh are arranged in row-major order. Values are accumulated toward the center of the mesh and partial results are propagated outward from the center of the mesh to complete the cyclic segmented prefix operation. This embodiment has been shown to be time-optimal. In another embodiment of the present invention, the prefix nodes are arranged such that the prefix node corresponding to the last element in the array is located at the center of the array. This alternative embodiment is also time-optimal, but it is optimal in terms of wire-lengths (and therefore propagation delays) as well.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 10 is a diagram illustrating a segmented prefix sum;

FIG. 14 is a diagram of a cyclic segmented prefix sum over 16 elements;

FIGS. 19 and 20 are diagrams providing a critical path analysis of cyclic segmented prefix sums using two non-cyclic segmented sums;

FIG. 31 is a diagram illustrating an arrangement of prefix nodes for computing a time-optimal, wire-length-optimal cyclic segmented parallel prefix sum in a mesh topology in accordance with a preferred embodiment of the present invention;

DETAILED DESCRIPTION

The following is intended to provide a detailed description of an example of the invention and should not be taken to be limiting of the invention itself. Rather, any number of variations may fall within the scope of the invention, which is defined in the claims following the description.

1. Prefix Computations

In this section, we discuss a circuit family called prefix computations. A prefix computation is defined on an input sequence $a=[a_0, a_1, \ldots, a_{n-1}]$, an output sequence $b=[b_0, b_1, \ldots, b_{n-1}]$, and a binary, associative operator $\textcircled{x}$, such that $$b_0 = a_0,$$

$$b_k = a_0 \textcircled{x} a_1 \textcircled{x} \ldots \textcircled{x} a_k \text{ for } k=1,2,\ldots,n-1. \quad (1)$$

As an example of a prefix computation, consider addition as operator. Addition is a binary operator, and it is associative, that is $(a+b)+c=a+(b+c)$. Recall that associativity implies that the parentheses can be dropped, because the order in which the additions are performed is immaterial, at least from a mathematical perspective. Given the input sequence $a=[2, 7, 1, 1, 3, 5, 2, 4]$, we compute the elements of output sequence b as follows:

$$b_0=a_0=2$$

$$b_1=a_0+a_1=2+7=9$$

$$b_2=a_0+a_1+a_2=2+7+1=10$$

$$b_3=a_0+a_1+a_2+a_3=2+7+1+1=11$$

$$b_4=a_0+a_2+a_3+a_4=2+7+1+1+3=14$$

$$b_5=a_0+a_1+a_2+a_3+a_4+a_5=2+7+1+1+3+5=19$$

$$b_6=a_0+a_1+a_2+a_3+a_4+a_5+a_6=2+7+1+1+3+5+2=21$$

$$b_7=a_0+a_1+a_2+a_3+a_4+a_5+a_6+a_7=2+7+1+1+3+5+2+4=25$$

Thus, the prefix computation results in output sequence $b=[2, 9, 10, 11, 14, 19, 21, 25]$. It is easy to see that we can formulate the prefix computation with addition as the operator by means of the sum $$b_k = \sum_{i=0}^{k} a_i \text{ for } k = 0, 1, \ldots, n-1.$$

Furthermore, we can formulate the prefix computation by means of the recurrence $$b_0 = a_0,$$

$$b_k = b_{k-1} + a_k \text{ for } k=1, 2, \ldots, n-1, \quad (2)$$

due to associativity.

Figure 1:
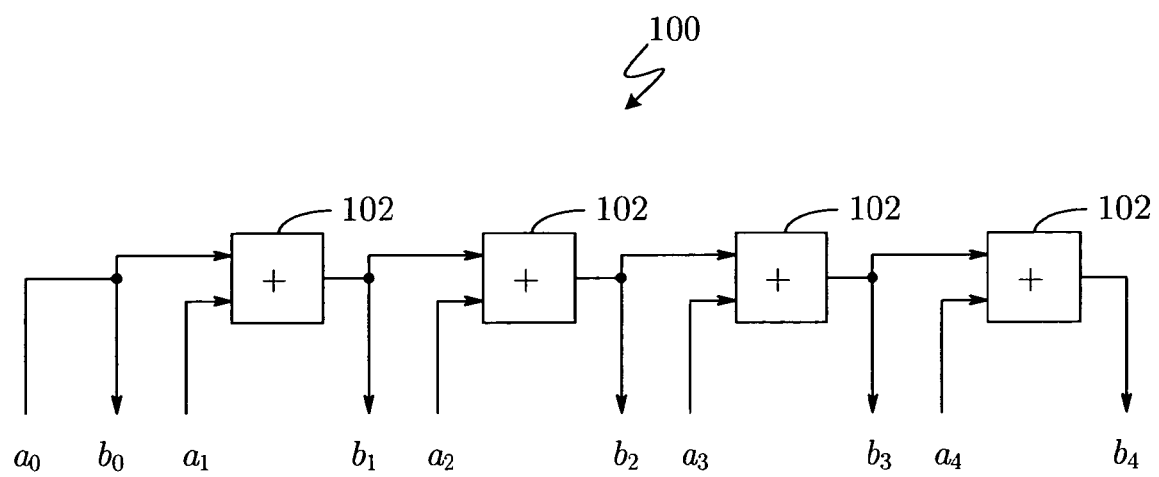
FIG. 1 is a diagram of a combinational prefix circuit that implements a prefix sum of length 5.

FIG. 1 is a diagram of a combinational prefix circuit 100 that implements the prefix sum for n=5. Circuit 100 comprises a plurality of adders 102, each having two inputs and one output. Each output is connected as one of the inputs to the next adder 102 and the other input is an $a_k$ value.

Figure 2:
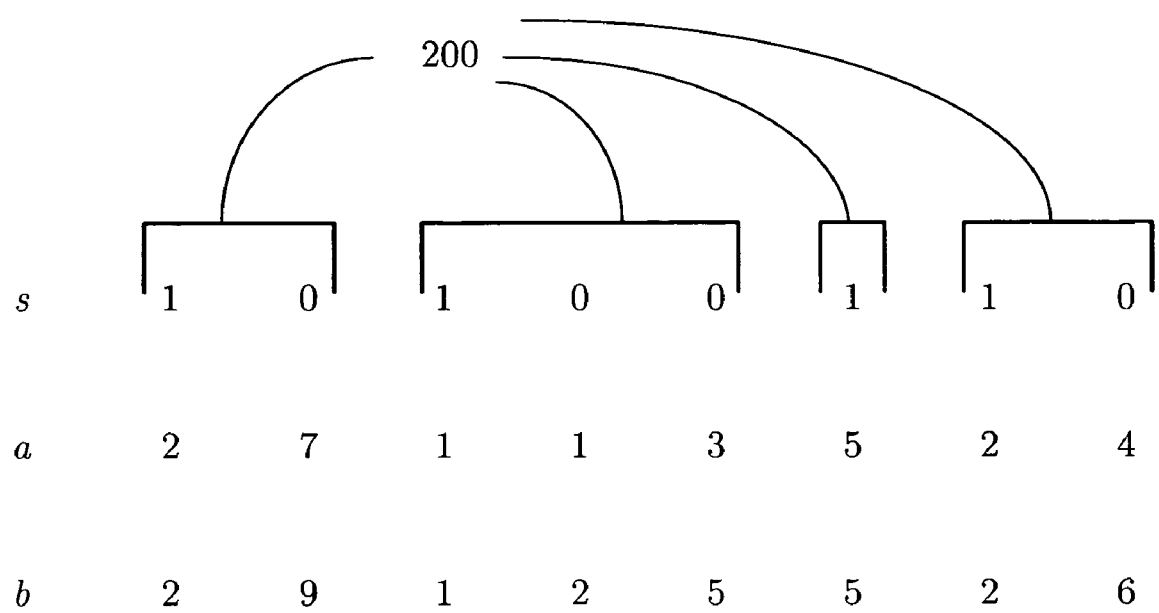
FIG. 2 is a diagram illustrating a segmented prefix sum with four segments.

A variation of the prefix computation is the segmented prefix computation. Analogously to the prefix computation, it is defined on an input sequence $a=[a_0, a_2, \ldots, a_{n-1}]$, an output sequence $b=[b_0, b_2, \ldots, b_{n-1}]$, and a binary, associative operator $\textcircled{x}$. However, a segmented prefix computation has an additional input sequence, the segment sequence $s=[s_0, s_1, \ldots, s_{n-1}]$ whose elements, the segment bits, are in the domain $\{0,1\}$, and $s_0=1$. The segment bits partition the input sequence into segments that begin where a segment bit is 1, and continue as long as the segment bits are 0. FIG. 2 illustrates a segmented prefix sum with four segments 200. The segments confine the prefix computation to within each segment such that it is independent of the other segments.

We can describe the segmented prefix sum by means of the recurrence:

$$b_0 = a_0, \quad (3)$$

$$b_k = \begin{cases} a_k & \text{if } s_k = 1 \\ b_{k-1} + a_k & \text{if } s_k = 0 \end{cases}$$

$$\text{for } k = 1, 2, \ldots, n-1.$$

The segmented prefix sum of the example in FIG. 2 defines the following sums:

$$s_0=1: b_0=a_0=2$$

$$s_1=0: b_1=b_0+a_1=2+7=9$$

$$s_2=1: b_2=a_2=1$$

$$s_3=0: b_3=b_2+a_3=1+1=2$$

$$s_4=0: b_4=b_3+a_4=2+3=5$$

$$s_5=1: b_5=a_5=5$$

$$s_6=1: b_6=a_6=2$$

$$s_7=0: b_7=b_6+a_7=2+4=6.$$

The resulting output sequence is $b=[2, 9, 1, 2, 5, 5, 2, 6]$. Note that the individual segments behave like independent prefix sums as described by Equation 2.

Figure 3:
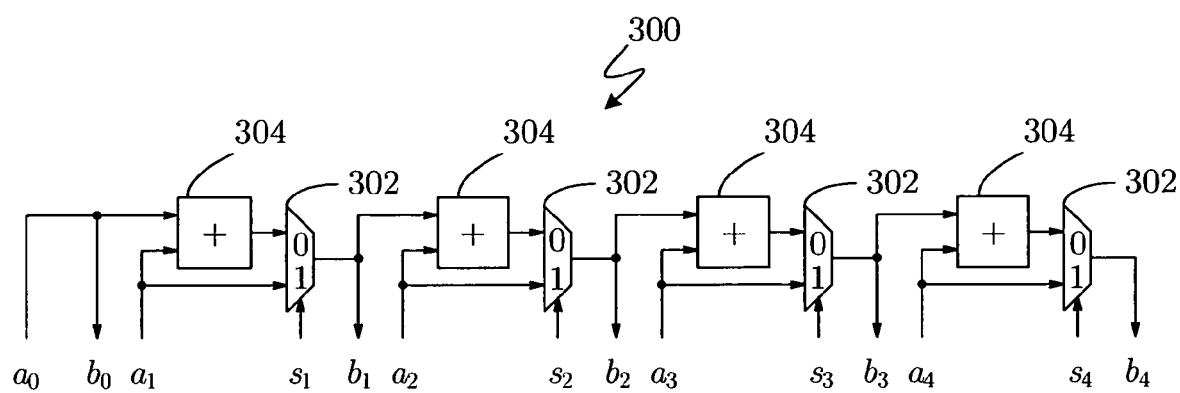
FIG. 3 is a diagram of a segmented prefix circuit to compute a segmented prefix sum of 5 elements.

The segmented prefix computation is straightforward to implement as a circuit. FIG. 3 shows a segmented prefix circuit 300 to compute the segmented prefix sum for n=5 elements. This circuit is a direct translation of the recurrence in Equation 3, including the constraint that segment bit $s_0=1$. Compared to the unsegmented prefix sum in FIG. 1, we insert a multiplexer 302 at the output of each adder 304. Each multiplexer 302 is controlled by a corresponding segment bit. If the segment bit is $s_k=1$, we start a new segment, by feeding the input element $a_k$ through multiplexer 302. Otherwise, we forward the output of adder 304 to become $b_k$. Those skilled in the art will recognize that we can generalize this circuit by replacing adders 304 with any associative binary operator $\otimes$.

Figure 4:
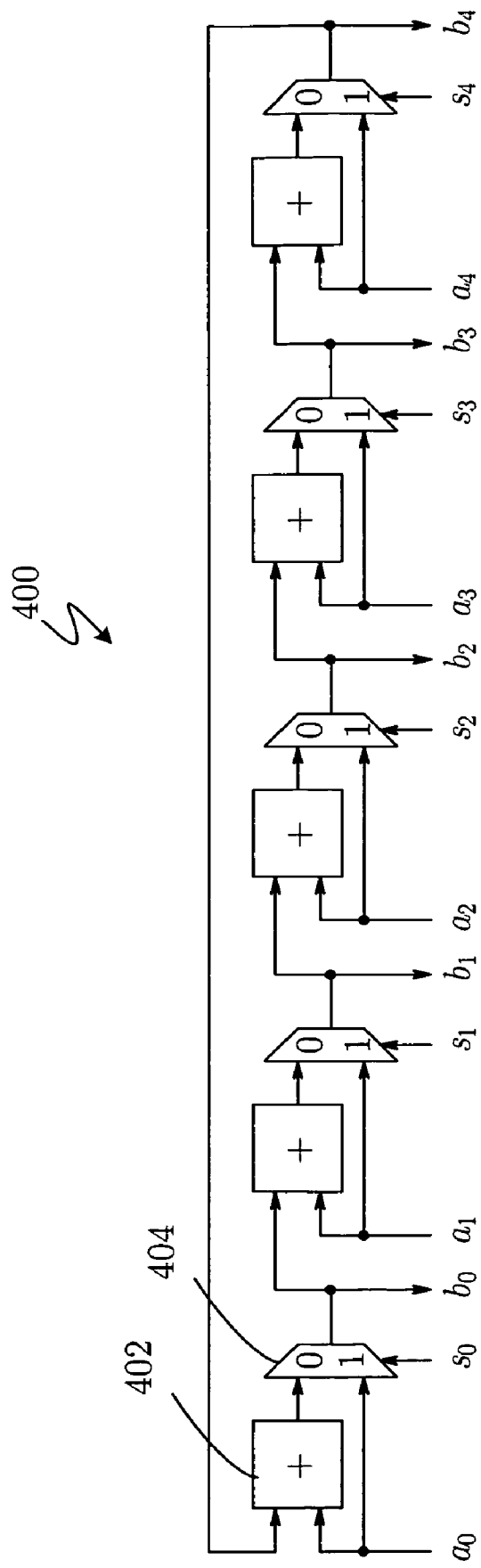
FIG. 4 is a diagram of a circuit to compute a cyclic segmented prefix sum.

Finally, we extend the segmented prefix computation into a cyclic segmented prefix computation by wrapping around output value $b_{n-1}$, and feeding it into position 0. Furthermore, we relax the constraint $s_0=1$ so as to be variable $s_0 \in \{0,1\}$. FIG. 4 shows a circuit 400 for a cyclic segmented prefix sum as an example. Note that, compared to FIG. 3, we include an additional adder 402 and multiplexer 404 for position 0. The output $b_4$ is also wrapped around into adder 402, thus making the prefix sum cyclic.

The following recurrence formalizes the cyclic segmented prefix computation for an associative binary operator $\otimes$ using modular index arithmetic to express the wrap-around:

$$b_{k \bmod n} = \begin{cases} a_{k \bmod n} & \text{if } s_{k \bmod n} = 1 \\ b_{k-1 \bmod n} \otimes a_{k \bmod n} & \text{if } s_{k \bmod n} = 0 \end{cases} \quad (4)$$

$$\text{for } k = 0, 1, \ldots, n-1$$

This recurrence has a solution if there exits at least one index k' for which segment bit $s_{k'}=1$.

As a concrete example, consider the segmented prefix sum in FIG. 2. Assume that the sum shall be cyclic, that is it wraps around from the rightmost to the leftmost element, and that segment bit $s_0$ assumes value 0 rather than value 1 as shown in FIG. 2. We can compute the output sequence as follows:

$s_0=0$: $b_0=b_7+a_0=6+2=8$ $s_1=0$: $b_1=b_0+a_1=8+7=15$ $s_2=1$: $b_2=a_2=1$ $s_3=0$: $b_3=b_2+a_3=1+1=2$ $s_4=0$: $b_4=b_3+a_4=2+3=5$ $s_5=1$: $b_5=a_5=5$ $s_6=1$: $b_6=a_6=2$ $s_7=0$: $b_7=b_6+a_7=2+4=6$.

The resulting output sequence is b=[8, 15, 1, 2, 5, 5, 2, 6]. Note that we cannot compute $b_0$ unless we know the value of $b_7$. The recurrence forces us to unroll the recursion until we visit an index with a segment bit of value 1, in this case wrapping around to $s_6$.

Additional information regarding cyclic segmented prefix circuits as they are known in the art can be found in U.S. Pat. No. 6,609,189 (KUSZMAUL et al.) Aug. 19, 2003, which is incorporated herein by reference.

2. Prefix Computations for a 2-Dimensional Mesh

We present prefix computations on a 2-dimensional mesh for each of the variations discussed in Section 1. We analyze the performance of these circuits, focusing our attention on signal propagation delays through wires. We lump the operator delays into the Landau notation. Note that our prefix circuits are purely combinational. Therefore, the bounds on execution time resulting from our analysis, are also bounds for the critical path length of these circuits.

2.1. Prefix Sum on 2-Dimensional Mesh

Figure 5:
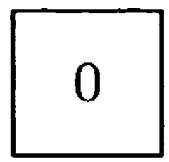
FIG. 5 is a diagram of an arrangement of prefix nodes for computing a prefix sum in a mesh topology.
Figure 5:
Figure 5:
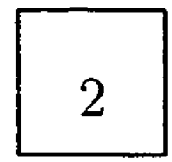
Figure 5:
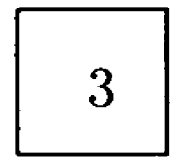
Figure 5:
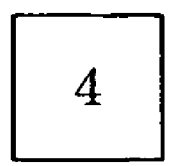
Figure 5:
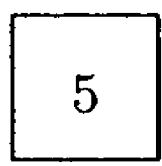
Figure 5:
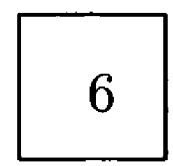
Figure 5:
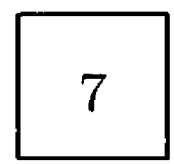
Figure 5:
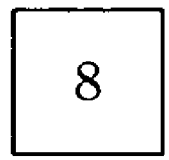
Figure 5:
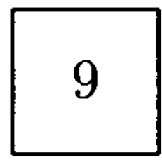
Figure 5:
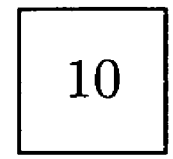
Figure 5:
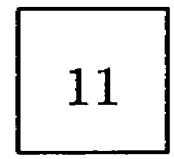
Figure 5:
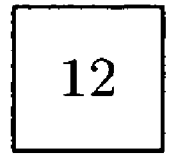
Figure 5:
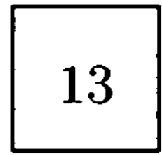
Figure 5:
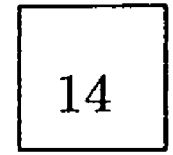
Figure 5:
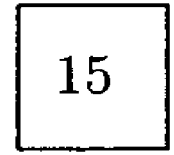
Figure 6:
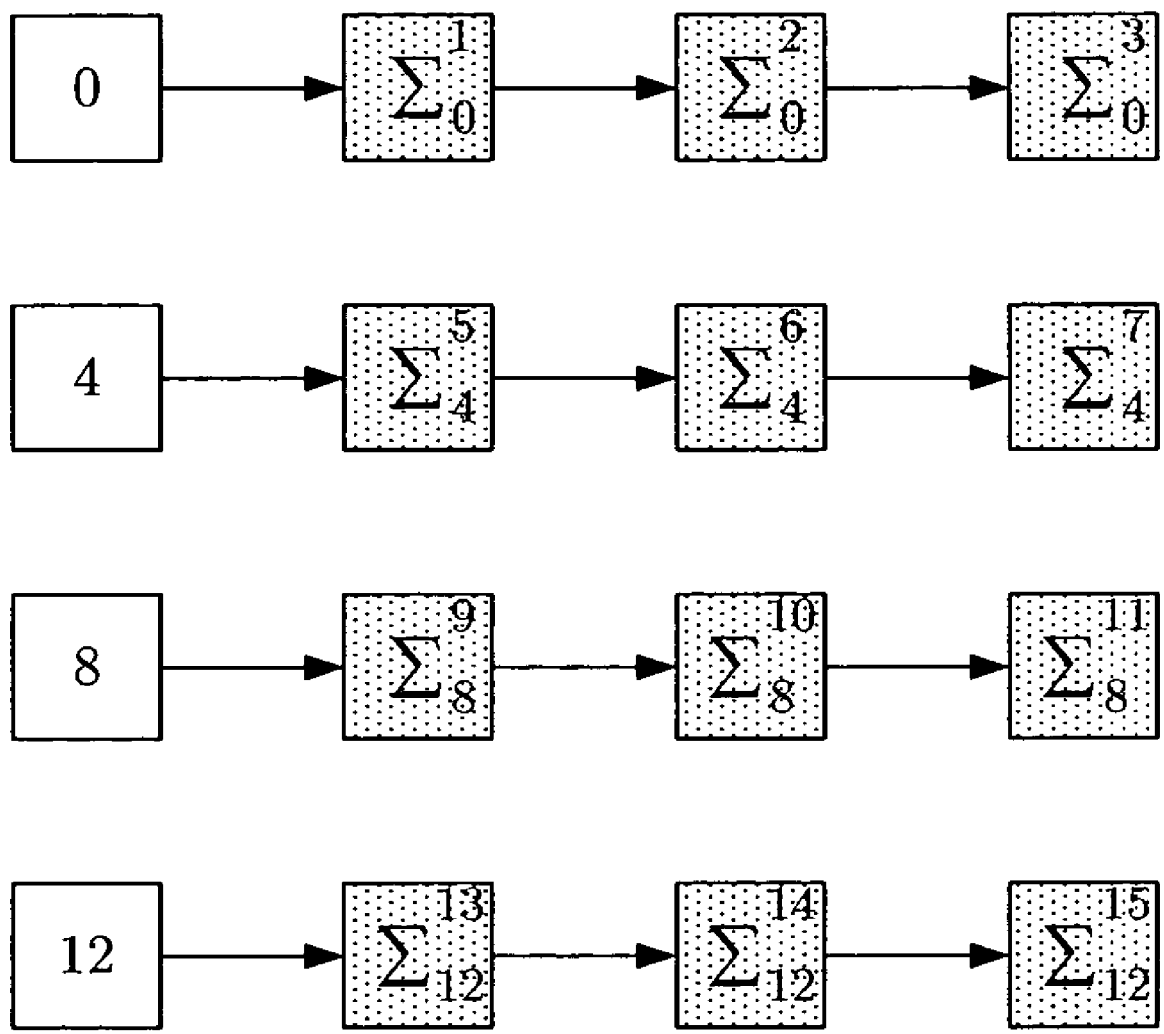
FIGS. 6-8 are diagrams illustrating stages of computing a prefix sum in the mesh topology provided in FIG. 5.
Figure 7:
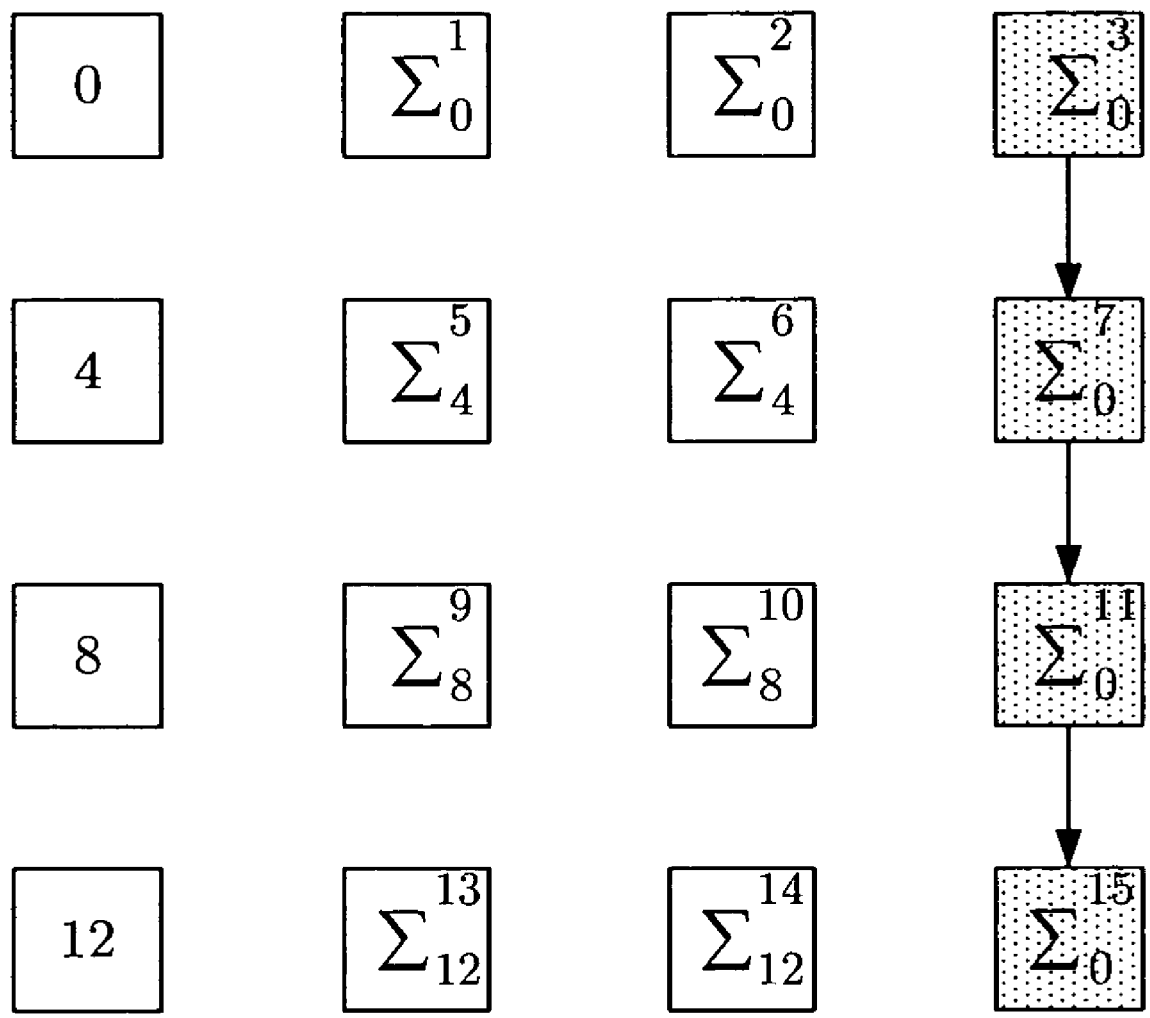
Figure 8:
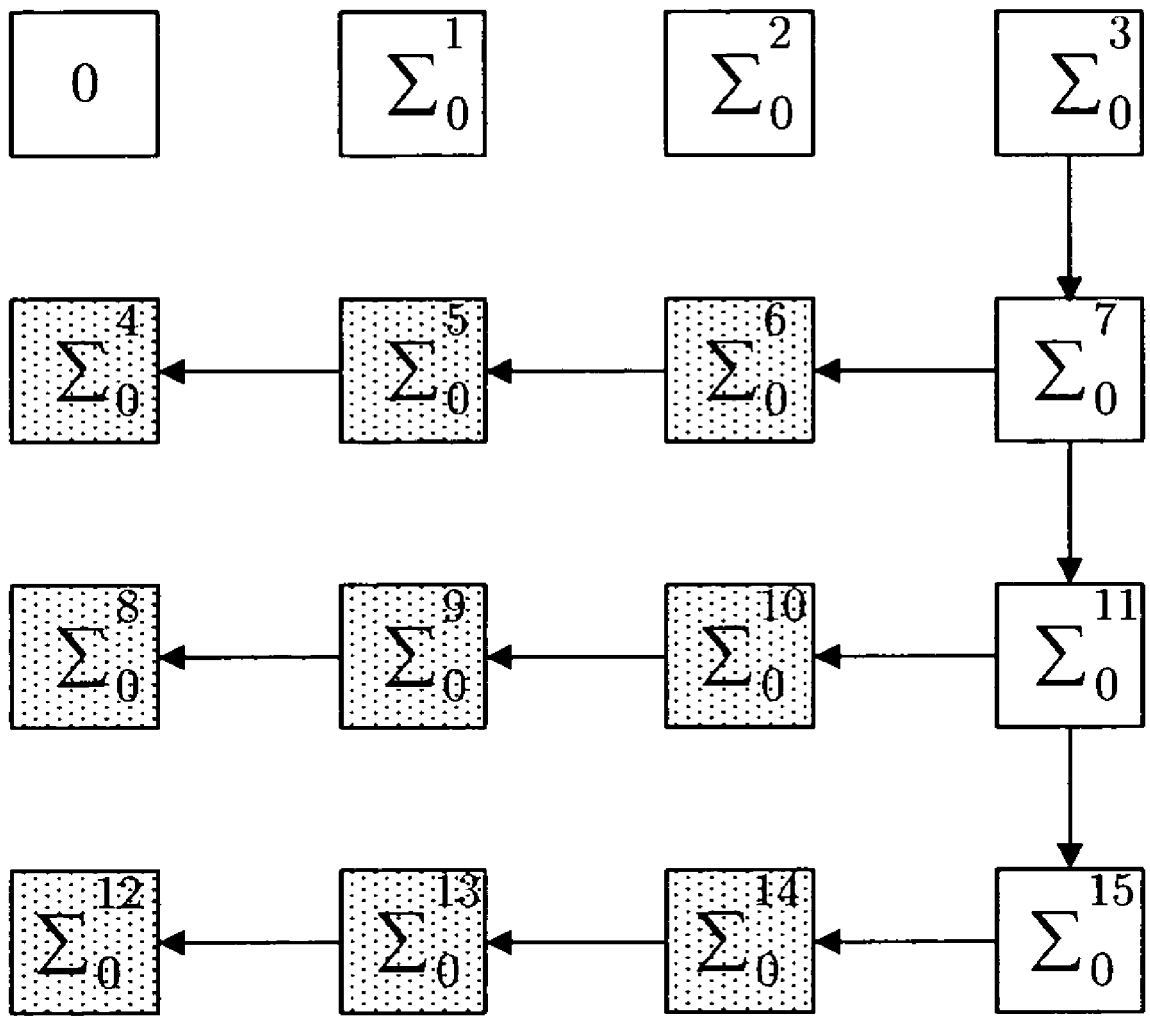

We begin our study of prefix computations on a 2-dimensional mesh with a concrete example, a prefix sum. We assume that the mesh has n prefix nodes and, therefore, a side length of $\sqrt{n}$. FIGS. 6-8 illustrate the computation in three phases. The prefix nodes are indexed as shown in FIG. 5, in row major order (Those skilled in the art will recognize that an arrangement in column major order, where the roles of columns and rows are reversed is also possible. However, for the purpose of facilitating an understanding of the relative relationships between rows and columns in a preferred embodiment of the present invention, we adopt herein the convention of using the terms "row major order," "row," and "column" in this description and in the claims, but note that these terms are intended to also mean "column major order," "column," and "row," respectively, in the case that a column major ordering is used [and, thus, rows become columns, and vice versa]. We refer to the prefix nodes in FIG. 5 as being in row major order so as to distinguish between the ordinary row or column major orderings commonly used in data storage and the alternative ordering scheme illustrated in FIG. 31, which is neither a row major nor a column major ordering). Initially, prefix node k shall store input element $a_k$. At the end of the computation, prefix node k shall hold the sum $$b_k = \sum_{i=0}^{k} a_i.$$

Figure 9:
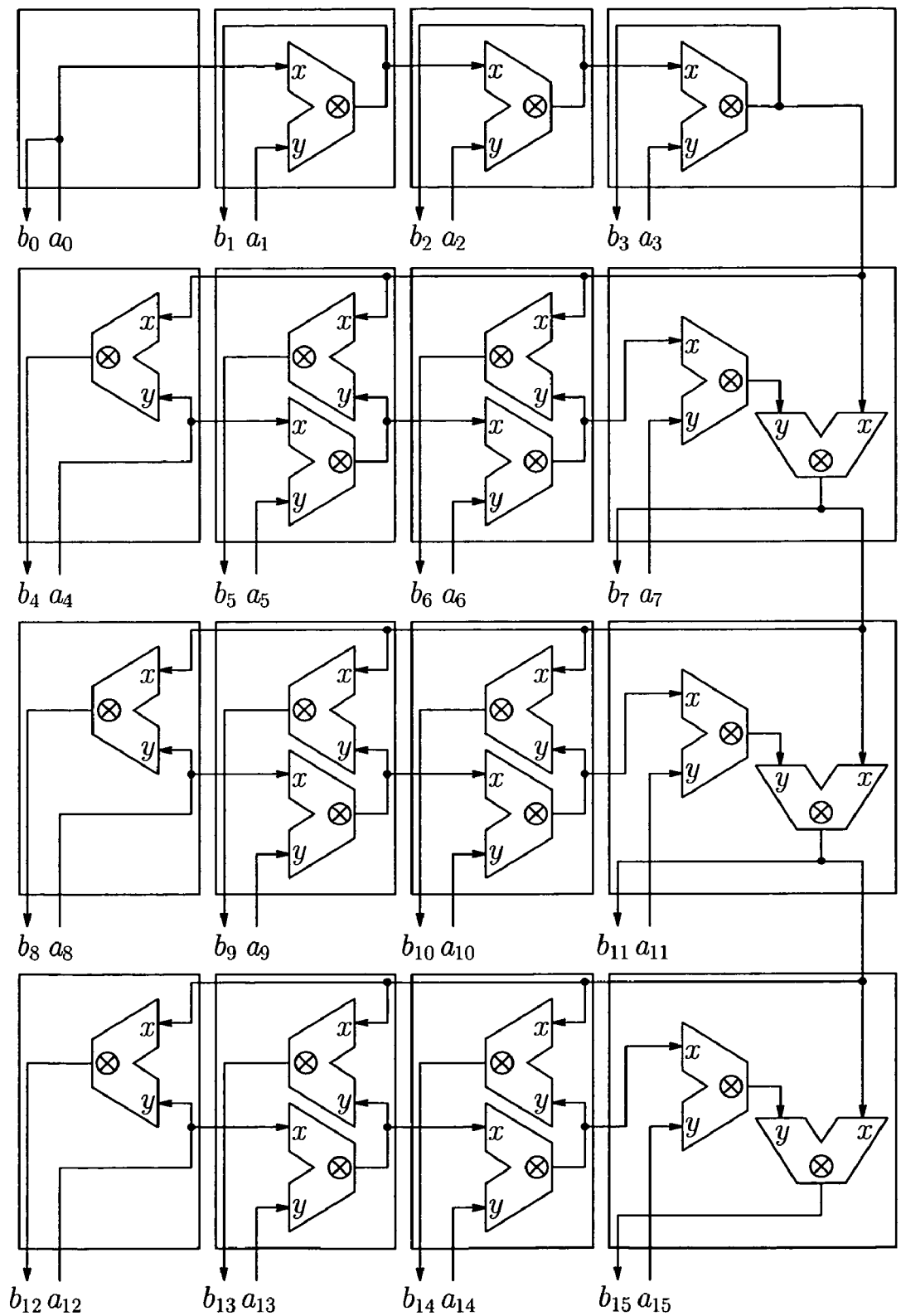
FIG. 9 is a schematic diagram of a combinational mesh-topology circuit to compute the prefix sum as in FIGS. 6-8.

It should be noted that, in this context, we use the term "prefix node" to denote the (segmented) prefix operators associated with position i of the prefix circuit. For instance, the circuit shown in FIG. 9 comprises a plurality of prefix nodes (in the sense used in this document) in a mesh arrangement, where each prefix node is a combinational circuit (in fact, the entire circuit shown in FIG. 9 is a combinational circuit). Prefix node i in FIG. 9 is associated with input $a_i$ and output $b_i$. In a typical embodiment, each prefix node is connected to a "processor" that assigns input $a_i$ and uses output $b_i$. One skilled in the art will recognize that our usage of the term "prefix node" encompasses such combinational circuits as well as potentially sequential circuits (including pipelined versions or more complex sequential circuits such as microprocessors). Thus, the term "prefix node," as used in this detailed description and the accompanying claims, should not be interpreted in a limiting sense.

An obvious lower bound for the execution time of the prefix sum is $\Omega(\sqrt{n})$, because input value $a_0$ must travel from the top-left prefix node to the bottom-right prefix node. If we assume one time unit for the propagation delay of a signal between neighboring prefix nodes, the execution time T must be $T \geq 2(\sqrt{n}-1)$. The execution time of our prefix computation meets the asymptotic lower bound, as we discuss in the following.

The prefix computation proceeds in three phases:

Row Prefix:
Each prefix node receives a value from the left neighbor, adds it to the local value, stores the sum locally, and passes the result to the right neighbor. The prefix nodes in the leftmost column do not add, but pass their input value directly to the right, and the prefix nodes in the rightmost column do not pass the result to the right. As shown in FIG. 6, this computation consists of √n̄ independent prefix sums of length √n̄, one in each row.

Column Prefix:

In the second phase, illustrated in FIG. 7, we perform a prefix sum in the rightmost column from top towards bottom. At the end of this phase, the prefix nodes in the rightmost column have completed their computation.

Row Update:

The remaining task is to update the prefix nodes in the lower left sub-matrix by adding the missing prefixes into their partial sums. The prefix needed in row r is available in the rightmost prefix node of row r−1. Thus, we pass this value through the entire row, from right to left, and each prefix node adds the value to its local sum, as shown in FIG. 8.

Straightforward analysis of our prefix sum reveals that the execution time is T=3Θ(√n̄), because each of the three phases requires time Θ(√n̄) to propagate the values through an entire row or column. Thus, our prefix sum meets the asymptotic lower bound.

A few comments are in order. First, the column prefix and row update phases can by overlapped to reduce the critical path length by a constant amount of time. For example, the prefix nodes in the rightmost column of FIG. 7 use the values received from the top as input to the adder. If they could send these values simultaneously to the bottom neighbors, we would not need to resend these values, as indicated by the top-to-down arrows in the rightmost column of FIG. 8.

Second, the prefix sum technique illustrated in FIGS. 5-8 is only one of many possible organizations. Different communication patterns as well as different computation patterns are possible. Additional information regarding the computation of (non-segmented) parallel prefix computations can be found in Ömer Eğecioğlu and Ashok Srinivasan. Optimal Parallel Prefix on Mesh Architectures. *Parallel Algorithms and Applications*, I:191-209, 1993, which is incorporated herein by reference.

We show one possible implementation of the prefix sum as a combinational circuit with 2-dimensional mesh topology in FIG. 9.

2.2. Segmented Prefix Sum on 2-Dimensional Mesh

The prefix computation in Section 2.1 may be deceivingly simple. At the first glance, we may suspect that we violate the assumption that the operator of a prefix computation is not necessarily commutative. Using addition as the operator has hidden this issue from the discussion, because addition is commutative. In a segmented prefix circuit, we must pay attention to the fact that the operator intentionally does not commute, since segmentation does not commute.

Let us reexamine the segmented operation by introducing the following notation, borrowing from Cormen, Leiserson, and Rivest. *Introduction to Algorithms, MIT Press* 1990, p. 726, Exercise 30-1. For an associative binary operator $\otimes$, we introduce the segmented operator $\tilde{\otimes}$ for pairs $(s_x, x)$, where $x$ is an input value and $s_x$ is the associated segment bit, such that:

$$(s_x, x) \tilde{\otimes} (s_y, y) = \begin{cases} (1, y) & \text{if } s_y = 1, \\ (s_x, x \otimes y) & \text{if } s_y = 0. \end{cases} \quad (5)$$

Furthermore, output bit $b_y$ is the second element of the result pair, that is $$b_y = \begin{cases} y & \text{if } s_y = 1, \\ x \otimes y & \text{if } s_y = 0. \end{cases}$$

Operator $\tilde{\otimes}$ is associative, as can be proved by perfect induction.

The key consequence from the associativity of operator $\tilde{\otimes}$ is that we can rearrange the order of evaluation of the segmented prefix computations arbitrarily, just as for operator $\otimes$. Let us gain confidence in this result by reorganizing the segmented prefix sum in FIG. 10 to match our prefix computation in Section 2.1.

The row prefix, here in segmented form, leaves the elements in the leftmost column untouched. It yields the following partial sums:

| | | | |
|---|---|---|---|
| 0: (1, 2) | 1: (1, 9) | 2: (1, 10) | 3: (1, 11) |
| 4: (0, 3) | 5: (0, 8) | 6: (0, 10) | 7: (1, 4) |
| 8: (0, 5) | 9: (1, 3) | 10: (1, 4) | 11: (1, 8) |
| 12: (1, 3) | 13: (1, 5) | 14: (1, 2) | 15: (1, 6) |

Next, the column prefix, also in segmented form, does not change the values in the rightmost column, because all segment bits have value 1. Finally, we perform the segmented version of the row update. For example, we update element 4, 5, and 9 to become:

4: $(1,11) \tilde{+} (0,3) = (1,14)$,

5: $(1,11) \tilde{+} (0,8) = (1,19)$,

6: $(1,4) \tilde{+} (1,3) = (1,3)$.

The complete set of prefix sums is shown below.

| | | | |
|---|---|---|---|
| 0: (1, 2) | 1: (1, 9) | 2: (1, 10) | 3: (1, 11) |
| 4: (1, 14) | 5: (1, 19) | 6: (1, 21) | 7: (1, 4) |
| 8: (1, 9) | 9: (1, 3) | 10: (1, 4) | 11: (1, 8) |
| 12: (1, 3) | 13: (1, 5) | 14: (1, 2) | 15: (1, 6) |

Comparison with the output sequence in FIG. 10 confirms that our segmented prefix computation yields the correct result.

Let us examine the definition in Equation 5 in more detail. First of all, we observe that we can express the segment bit of expression $(s_x, x) \tilde{\otimes} (s_y, y)$ as $s_x \vee s_y$, where $\vee$ denotes the logical-or operation. The proof of this fact is straightforward by perfect induction. Furthermore, we may use explicit segment bits to represent intermediate results of a segmented computation. For example, consider the segmented computation:

$$(s_v, v) = (s_x, x) \tilde{\otimes} (s_y, y) \tilde{\otimes} (s_z, z) \tilde{\otimes} (s_u, u) \quad (6)$$

Note that Equation 6 is not a prefix computation, but merely a segmented computation. We may express the linear, left-to-right evaluation of the segmented computation, cf. FIG. 3, algebraically as $$(s_v, v) = ((((s_x, x) \tilde{\otimes} (s_y, y)) \tilde{\otimes} (s_z, z)) \tilde{\otimes} (s_u, u)).$$

We can separate the computation of segment bit $s_v$ from the computation of the output bits, and obtain:

$$s_v = (((s_x \vee s_y) \vee s_z) \vee s_u).$$

Since the logical-or operation is not only associative but also commutative, we can drop the parentheses in this expression, and reorder the evaluation arbitrarily.

The preceding insight is useful for reorganizing the segmented computation by exploiting associativity. For example, we may choose to evaluate Equation 6 as follows:

$$(s_v, v) = ((s_x, x) \tilde{\otimes} (s_y, y)) \tilde{\otimes} ((s_z, z) \tilde{\otimes} (s_u, u)). \quad 5$$

Figure 11:
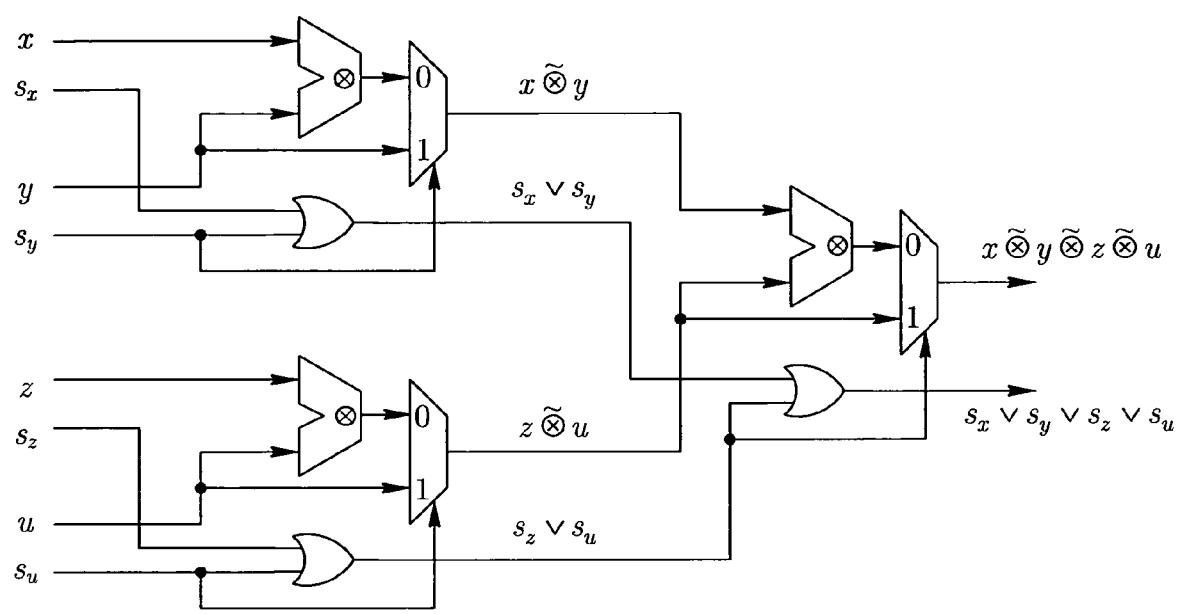
FIG. 11 is a diagram of a combinational circuit for computing a segmented computation.

Here, the segment bit associated with the left expression is $s_x \vee s_y$, the segment bit of the right expression is $s_z \vee s_u$, and the segment bit associated with the result is $s_x \vee s_y \vee s_z \vee s_u$. FIG. 11 shows the corresponding segmented circuit. Note that if output $(s_x \vee s_y) \vee (s_z \vee s_u)$ remains unused, we can eliminate the or-gates that compute $s_x \vee s_y$ and $(s_x \vee s_y) \vee (s_z \vee s_u)$ from the circuit. The circuit in FIG. 11 serves as a basic component for tree-structured segmented prefix circuits as in the aforementioned U.S. Pat. No. 6,609,189 (KUSZMAUL et al.) Aug. 19, 2003.

As a second example, we may choose to evaluate the expression in Equation 6 from right to left:

$$(s_v, v) = ((s_x, x) \tilde{\otimes} ((s_y, y) \tilde{\otimes} ((s_z, z) \tilde{\otimes} (s_u, u)))). \quad 20$$

Figure 12:
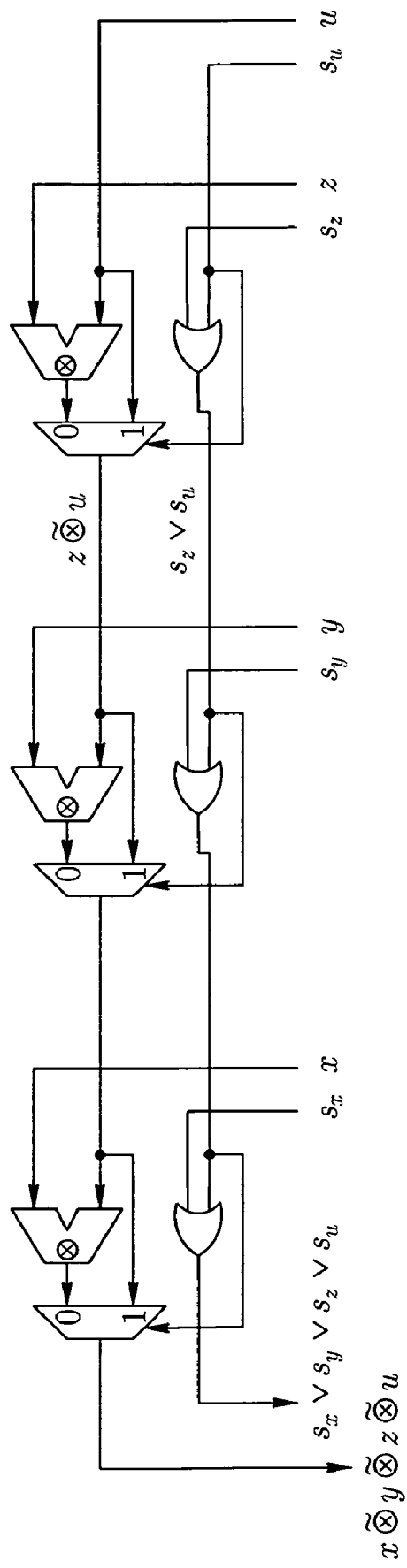
FIG. 12 is a diagram of an alternative combinational prefix circuit for computing a segmented prefix sum, which illustrates the associativity of the segmented prefix operation.

FIG. 12 shows the segmented circuit for computing this expression. The input and segment bits are arranged from left to right, while the computation proceeds from right to left. At the first glance, it may be perplexing that this circuit implements the same computation than a segmented circuit, where values propagate from left to right instead. The key for correctness lies in the or-gates, which a segmented circuit with the opposite propagation direction does not need.

Figure 13:
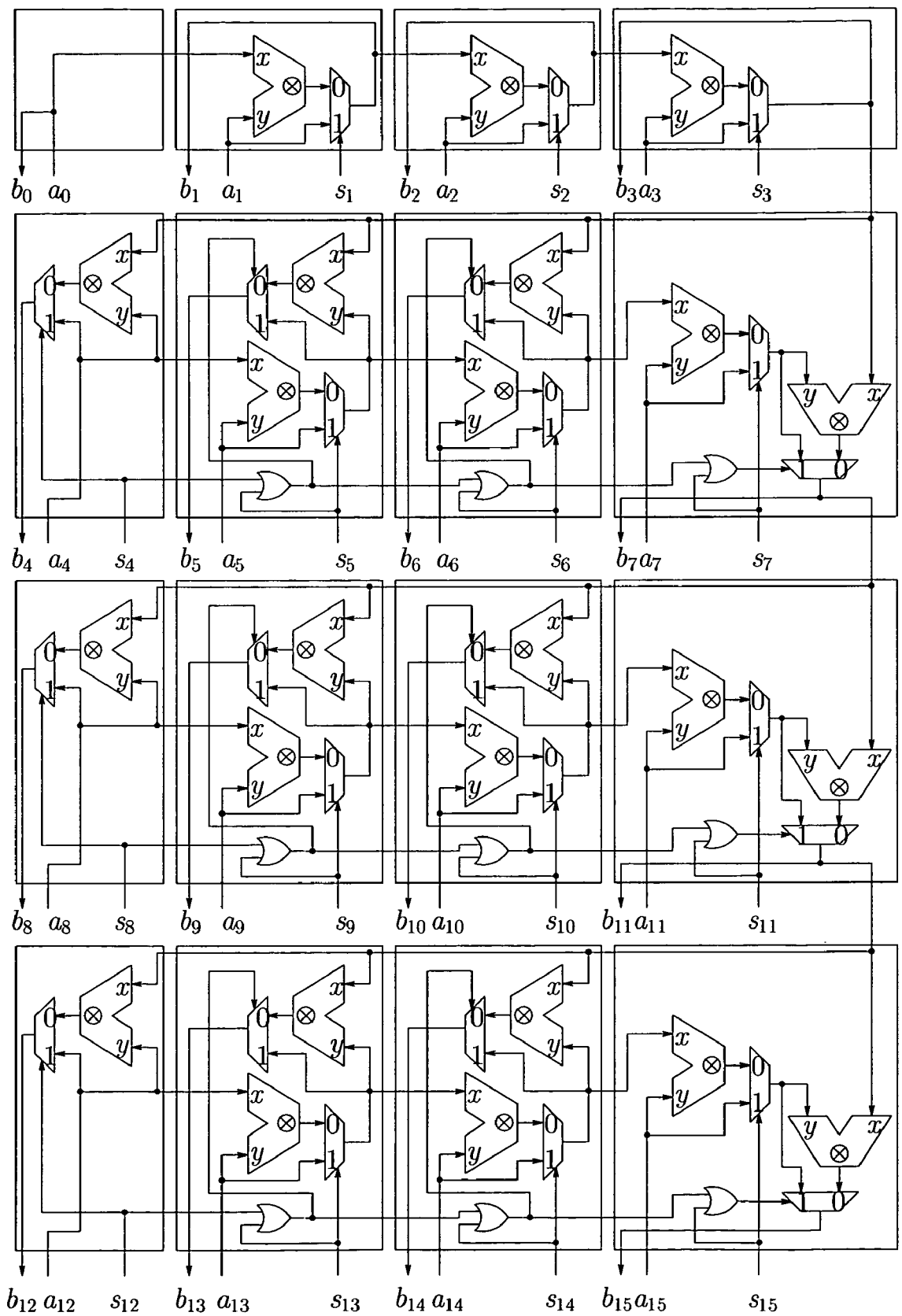
FIG. 13 is schematic diagram of a combinational mesh-topology circuit to compute a segmented prefix sum.
Figure 15:
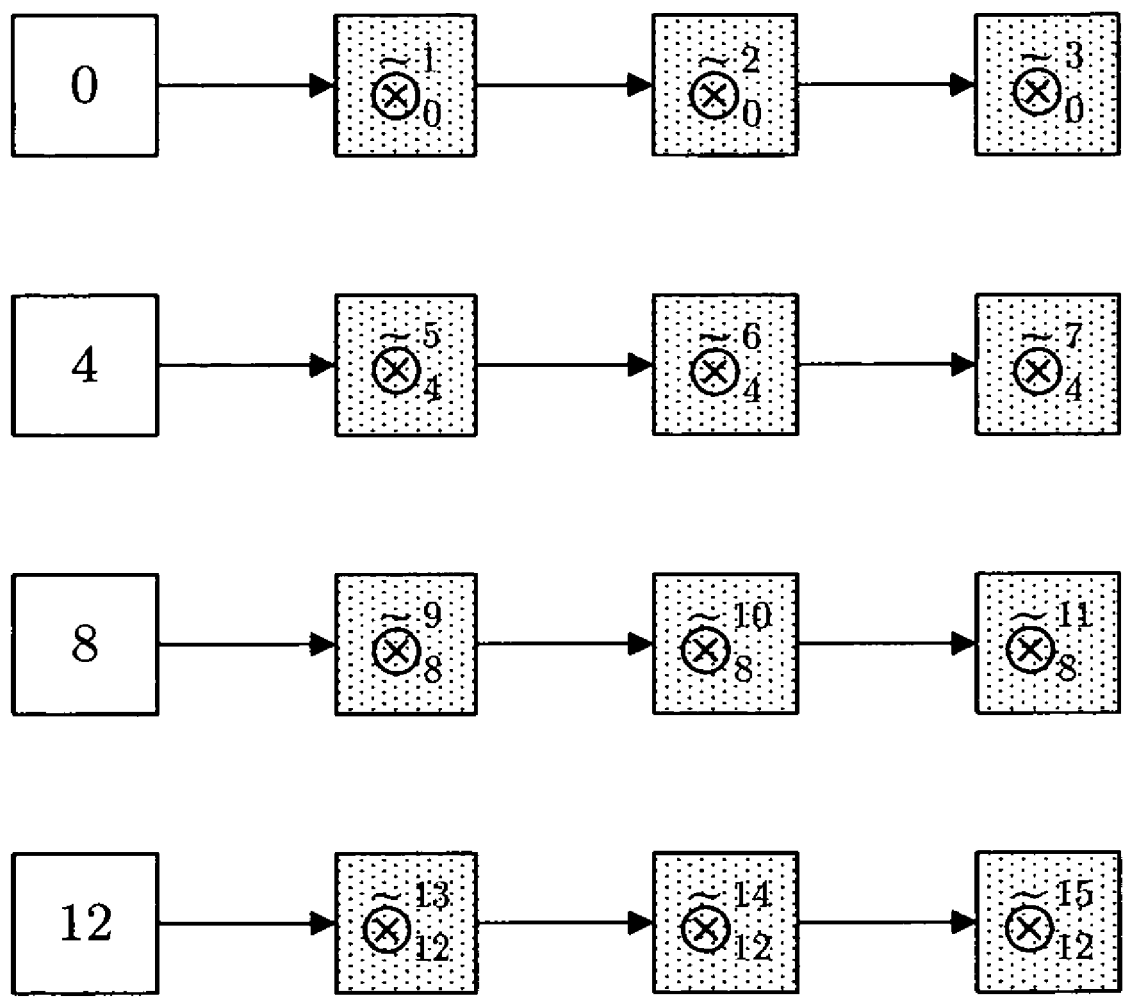
FIGS. 15-18 are diagrams illustrating phases in computing a segmented parallel prefix operation in a mesh topology.
Figure 16:
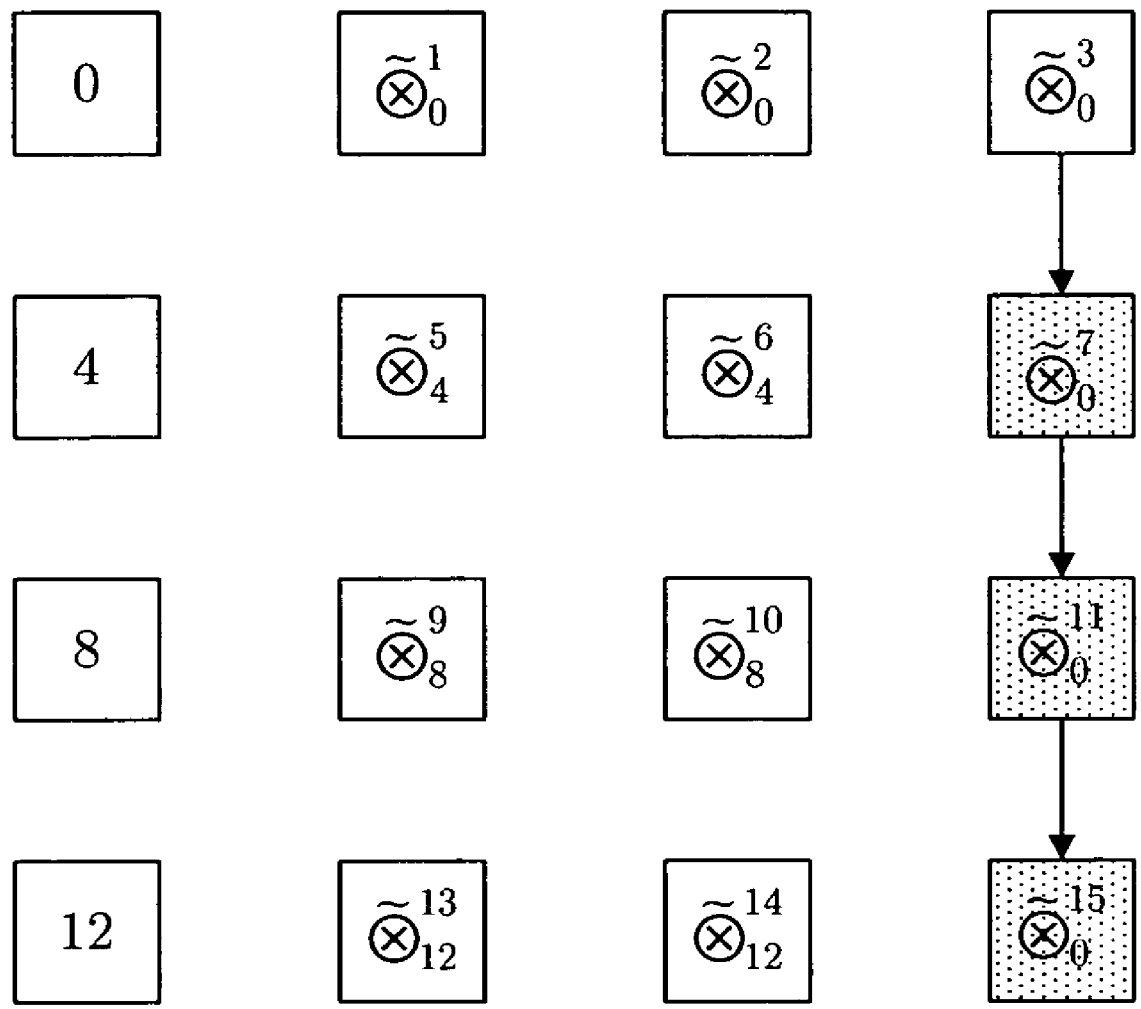
Figure 17:
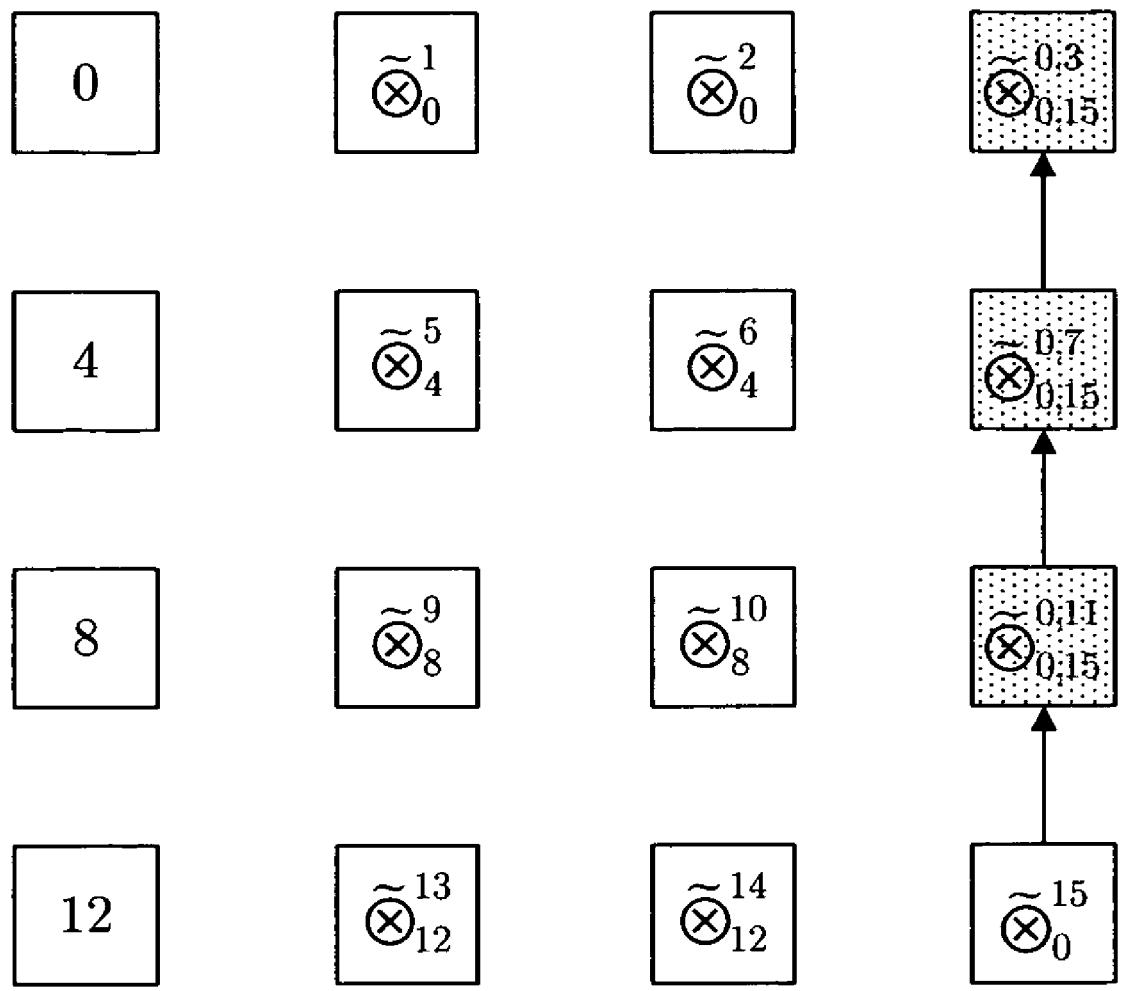
Figure 18:
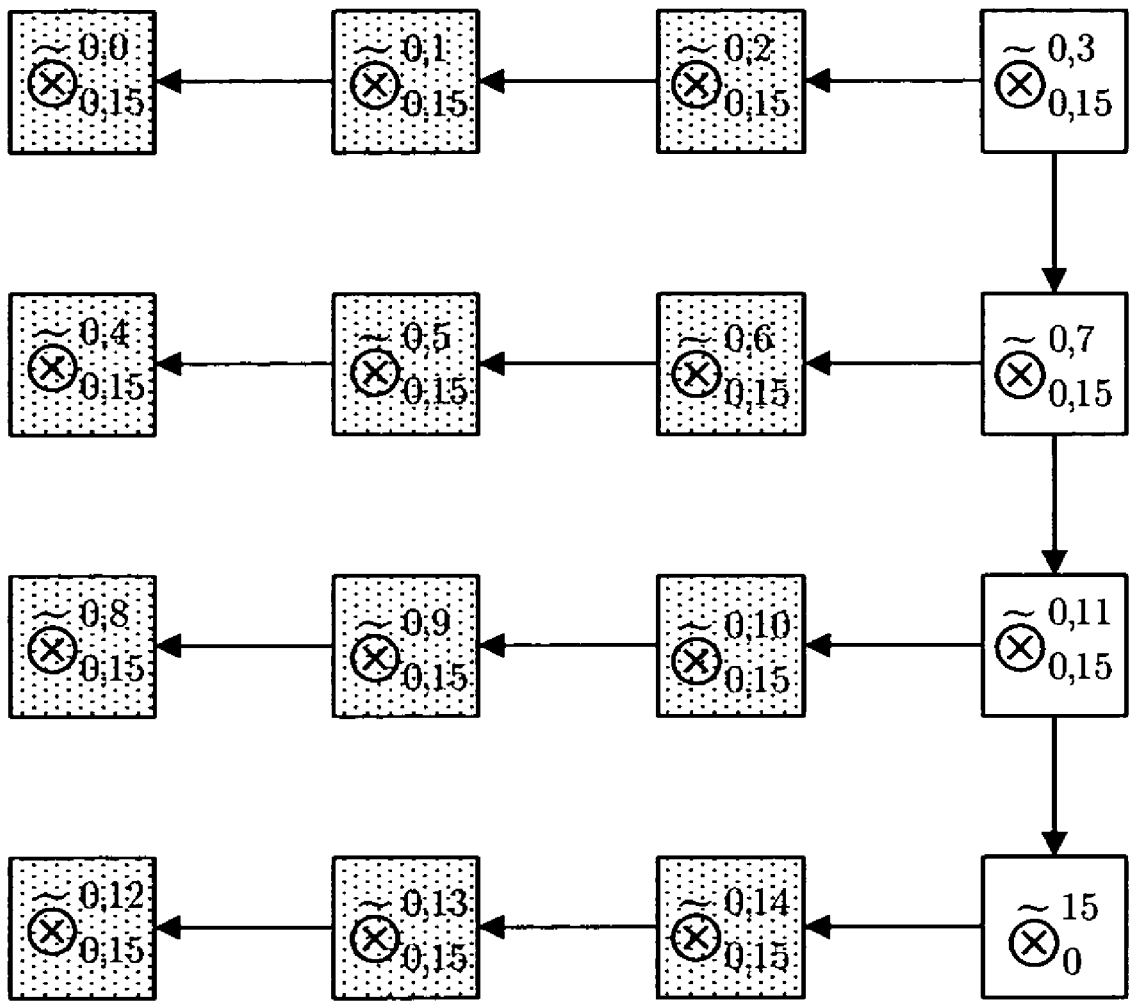
Figure 21:
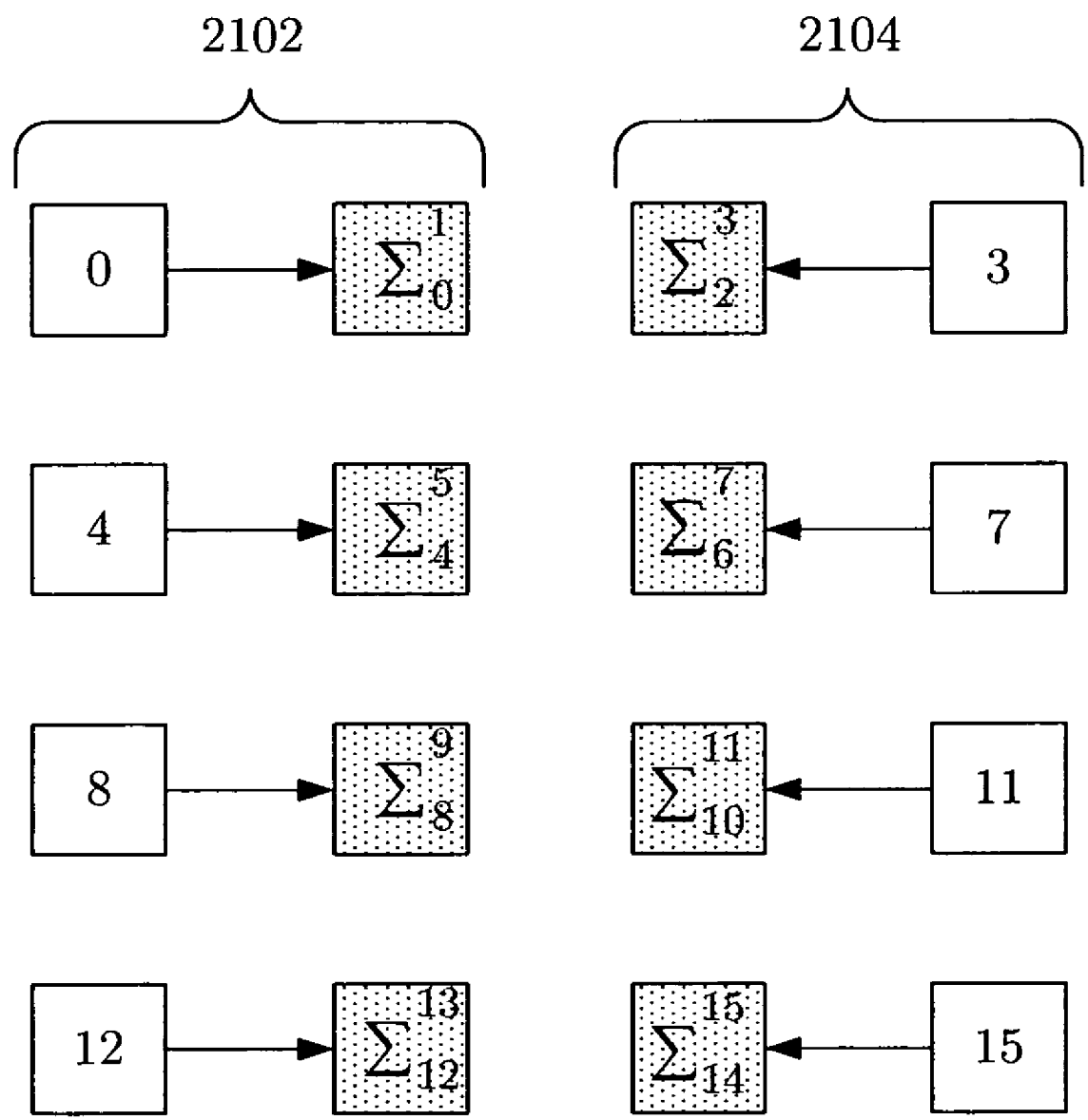
FIGS. 21-24 are diagrams illustrating phases in computing a time-optimal parallel prefix operation in a mesh topology in accordance with a preferred embodiment of the present invention.
Figure 22:
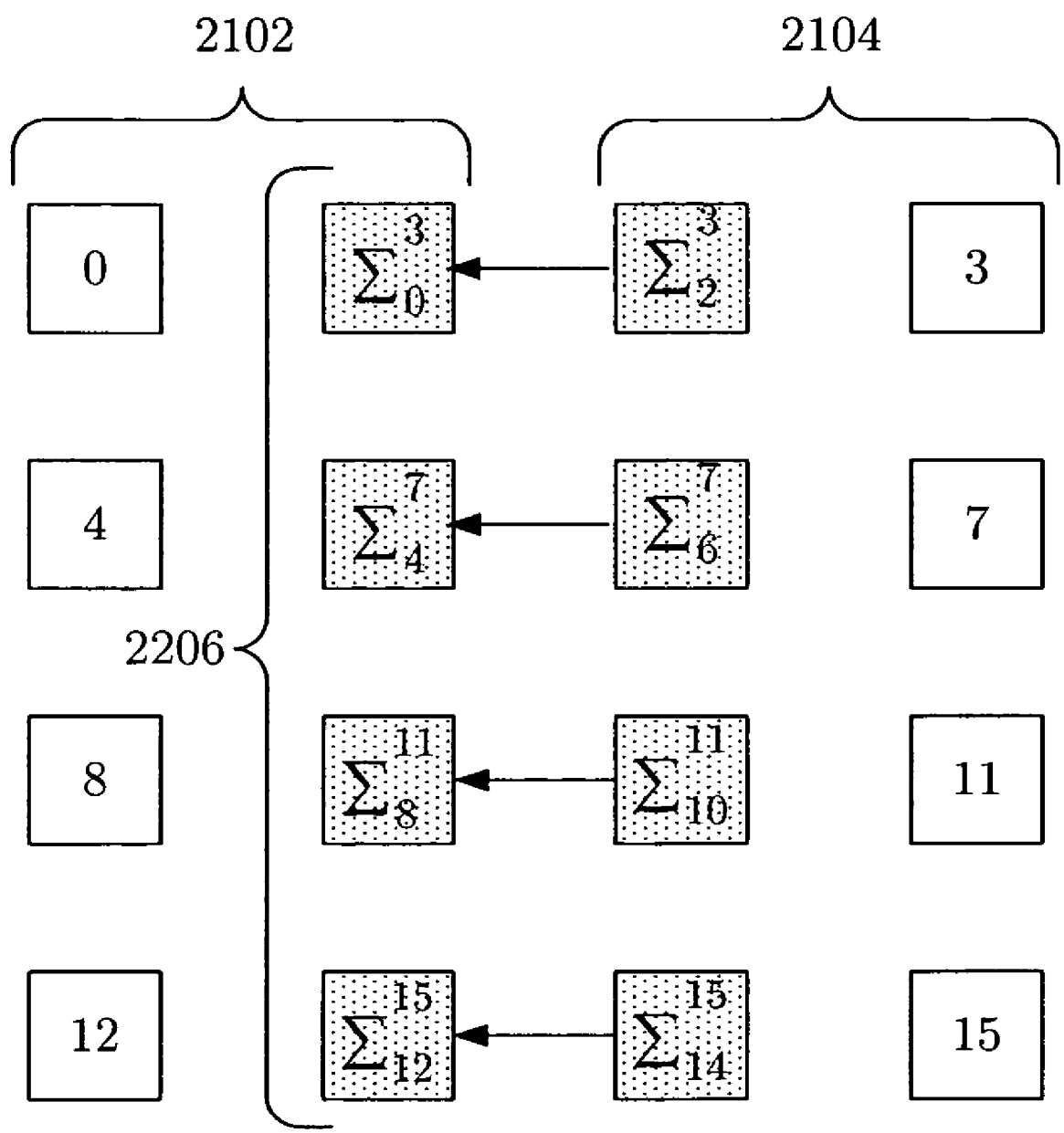
Figure 23:
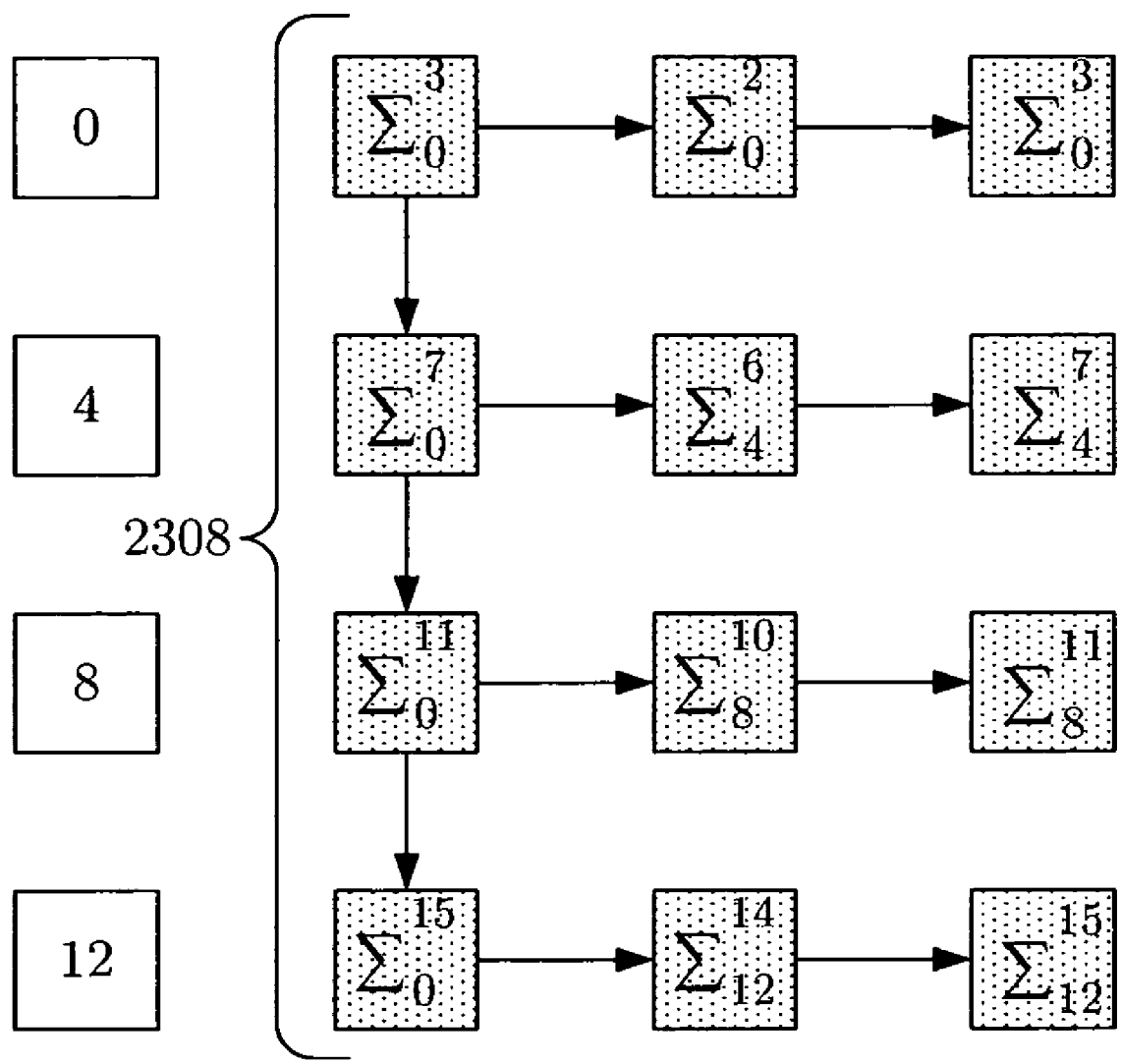

By now, we have at our disposal all the knowledge necessary to comprehend the segmented prefix circuit with a mesh topology shown in FIG. 13. This circuit computes the row prefix from left to right in each row. The top row is the simple segmented prefix computation, illustrated with an addition in FIG. 3. The partial prefix of the first row must be combined with each element of the second row. The operators directed from right to left perform this computation. The corresponding multiplexers are controlled by the chain of or-gates at the bottom of the row. In the rightmost prefix node, we combine the top row with the second row, and feed the result as input into the third row. The computations in the third and fourth row proceed analogously.

Accounting for wire lengths as dominating effect, the segmented prefix circuit in FIG. 13 has a critical path length of $3\Theta(\sqrt{n})$, because the inputs in the top-left prefix node traverse the top row from left to right, then the rightmost column from top to bottom, and finally the bottom row from right to left. This circuit has $2\sqrt{n}(\sqrt{n}-1)$ operators and multiplexers. Compared to a linear organization, the mesh circuit reduces the critical path length from $\Theta(n)$ to $\Theta(\sqrt{n})$, at the expense of almost doubling the number of operators.

2.3. Cyclic Segmented Prefix Sum on 2-Dimensional Mesh

We begin our introduction of cyclic segmented prefix circuits with a concrete example. Consider the segmented prefix sum of FIG. 10. We introduce a cyclic wrap-around, and change segment bit $s_0$ from value 1 to value 0. FIG. 14 shows the cyclic variation.

The simplest strategy to implement a cyclic segmented prefix computation is to perform two phases of non-cyclic segmented prefix computations. In the first phase, we compute the non-cyclic segmented prefix, assuming that $s_0=1$. In the second phase, we include the cyclic wrap-around, assert the desired value of $s_0$, and redo the segmented prefix computation. Formally, we express this strategy for a cyclic segmented prefix computation as:

$$(s_k, b_k) = \bigotimes_{\substack{0 \leq i < n \\ s_0 = 1}} (s_i, a_i) \otimes \bigotimes_{0 \leq i \leq k} (s_i, a_i) \text{ for } k = 0, 1, \ldots, n-1. \quad (7)$$

Due to segmentation, correctness is guaranteed as long as at least one segment bit assumes value 1. From an operational perspective, we must arrange the order of evaluation such that the result $(s_{n-1}, b_{n-1})|_{s_0=1} = \tilde{\otimes}_0^{n-1}$ of the left compound expression is available before evaluating the right compound expression $\tilde{\otimes}_0^k$, each of which can be viewed as simulating a non-cyclic segmented prefix circuit whose segment starts at $k=0$.

We account for the cyclic wrap-around by extending our segmented prefix computation with a fourth phase:

Reverse Column Prefix:
After the column prefix, which performs a segmented prefix computation from top to bottom in the rightmost column, perform another column prefix in the rightmost column, this time in the reverse direction, that is bottom up. Use the value of the bottom-right element as prefix. Furthermore, we modify the row update to include the top row. The prefix for the top row is the bottom-right element $\tilde{\otimes}_0^{n-1}$.

We illustrate the cyclic segmented prefix using FIG. 14 as example. Phase 1, the segmented row prefix, yields the partial sums of Section 2.2, with the exception of the segment bits in the top row, which assume value 0 rather than value 1.

We illustrate the cyclic segmented prefix using FIG. 14 as example. Phase 1, the segmented row prefix, yields the partial sums of Section 2.2, with the exception of the segment bits in the top row, which assume value 0 rather than value 1.

| | | | |
|---|---|---|---|
| 0: (0, 2) | 1: (0, 9) | 2: (0, 10) | 3: (0, 11) |
| 4: (0, 3) | 5: (0, 8) | 6: (0, 10) | 7: (1, 4) |
| 8: (0, 5) | 9: (1, 3) | 10: (1, 4) | 11: (1, 8) |
| 12: (1, 3) | 13: (1, 5) | 14: (1, 2) | 15: (1, 6) |

Phase 2, the segmented column prefix, does not change the values in the rightmost column. Next, we include the reverse column prefix as phase 3, using pair $\tilde{\otimes}_0^{15}=(1,6)$ as prefix. As a result, only the top-right pair changes, because $(1,6)+(0,11)=(1,17)$. The segmented prefix sums after the reverse column prefix are as follows.

| | | | |
|---|---|---|---|
| 0: (0, 2) | 1: (0, 9) | 2: (0, 10) | 3: (1, 17) |
| 4: (0, 3) | 5: (0, 8) | 6: (0, 10) | 7: (1, 4) |
| 8: (0, 5) | 9: (1, 3) | 10: (1, 4) | 11: (1, 8) |
| 12: (1, 3) | 13: (1, 5) | 14: (1, 2) | 15: (1, 6) |

Finally, we perform phase 4, the modified segmented row update, which includes all rows including the top row, which uses the bottom-right element $\tilde{\otimes}_0^{15}=(1,6)$ as prefix. The complete set of prefix sums is shown below.

| | | | |
|---|---|---|---|
| 0: (1, 8) | 1: (1, 15) | 2: (1, 16) | 3: (1, 17) |
| 4: (1, 20) | 5: (1, 25) | 6: (1, 27) | 7: (1, 4) |
| 8: (1, 9) | 9: (1, 3) | 10: (1, 4) | 11: (1, 8) |
| 12: (1, 3) | 13: (1, 5) | 14: (1, 2) | 15: (1, 6) |

FIGS. 15-18, respectively, illustrate each of the four phases. Here, we use the notation $b_k = \tilde{\otimes}_{0,n-1}^{0,k} = \tilde{\otimes}_0^{n-1} \tilde{\otimes} \tilde{\otimes}_0^k$ to denote the cyclic segmented prefix operation according to Equation 7. It should be clear from FIGS. 15-18 that the cyclic segmented prefix computation requires execution time $T=4\Theta(\sqrt{n})$. Furthermore, straightforward counting of the segmented operations performed in FIGS. 15-18 yields $2n+\sqrt{n}-2$ as the number of operators needed for this implementation.

As educational examples, we discuss the two extreme cases of cyclic segmented prefix sums illustrated in FIGS. 19 and 20. We study the critical path length of the cyclic segmented prefix circuit by examining the signal propagation in two separate phases as suggested by Equation 7. Assume we pick sequence element $k=0$ to enforce executing the cyclic segmented prefix computation in two phases. Due to rotation symmetry, the particular index value of k is immaterial. During phase 1, we assert $s_0=1$, independent of the actual value. When the circuit has stabilized, we set $s_0$ to the desired value, that is $s_0=0$ in the examples of FIGS. 19 and 20.

Now, let us determine the critical path lengths of the two prefix sums in FIGS. 19 and 20, assuming a linear array with circular layout as the simplest underlying structure for accounting purposes. We begin with FIG. 19. During phase 1, the critical path is determined by segment [1,7], which generalizes to $T_1=\Theta(n-1)$ for arbitrary problem sizes n. In phase 2, signals change due to the propagation of the wrap-around signal $b_{n-1}=b_7$. However, only the value of $b_0$ is affected, adding $T_2=\Theta(1)$ to the critical path length for a total of $T=T_1+T_2=\Theta(n)$. Next, consider the example in FIG. 20. Here the contribution of phase 1 to the critical path is due to segment [0,6], yielding $T_1=\Theta(n-1)$. During phase 2, value $b_7$ must propagate across the same segment, so that phase 2 contributes the same path delay $T_2=\Theta(n-1)$ than phase 1 for a total of $T=\Theta(2n-2)$. The latter example constitutes the worst case scenario, which corresponds to executing the cyclic segmented prefix as two non-cyclic segmented prefix computations. Keep in mind, however, that, from the circuit perspective, the critical path length of a combinational linear array is $\Theta(n)$, because this is the amount of time it takes the output signals of the circuit to stabilize after the input values have been asserted. This phase perspective provides a conceptual framework for understanding the limits of the mesh-based cyclic segmented prefix circuits introduced in Section 3 below.

3. Optimizations

We introduce two optimizations to the above-described prefix circuits: (1) minimizing the constant factor of the critical path length and number of operators by rearranging the communication pattern in the mesh, and (2) pipelining of combinational circuits to increase throughput.

3.1. Cutting Constant Factors

Our goal is to optimize the prefix circuits presented in Section 2 so as to obtain the minimum possible execution time with the minimal number of operators. We begin with the simple prefix circuit, and evolve the circuit progressively into a near optimal implementation of the cyclic segmented prefix circuit on a mesh.

Recall the prefix circuit in FIG. 9, which implements the three phases described in Section 2.1. We may rearrange the data movements such that the row prefix from left to right is replaced by an inwards move from the left and rightmost columns towards the center column, and the row update from right to left is replaced by a data movement from right to left. FIGS. 21-24 illustrate this revised strategy.

The three phases shown in FIGS. 21-24 are the following:

Row Prefix:
We split the row prefix into two halves, a left half 2102 and a right half 2104, as in FIG. 21. Left half 2102 is a regular row prefix as described in Section 2.1. Right half 2104 is different, however. Here, we accumulate the partial sum from right to left without storing it locally. When the left and right halves meet (FIG. 22), we add the partial sums to obtain the row prefix associated with the rightmost element in Section 2.1 (row prefix 2206). To complete the row prefix, we send the prefixes from the left half to the right, as in FIG. 23.

Column Prefix:
The column prefix (also depicted in FIG. 23) is the same as in Section 2.1, except that it occurs in the center column of the mesh (column 2308). If $\sqrt{n}$ is even, we may choose between the column to the left or right of the vertical center cut.

Figure 24:
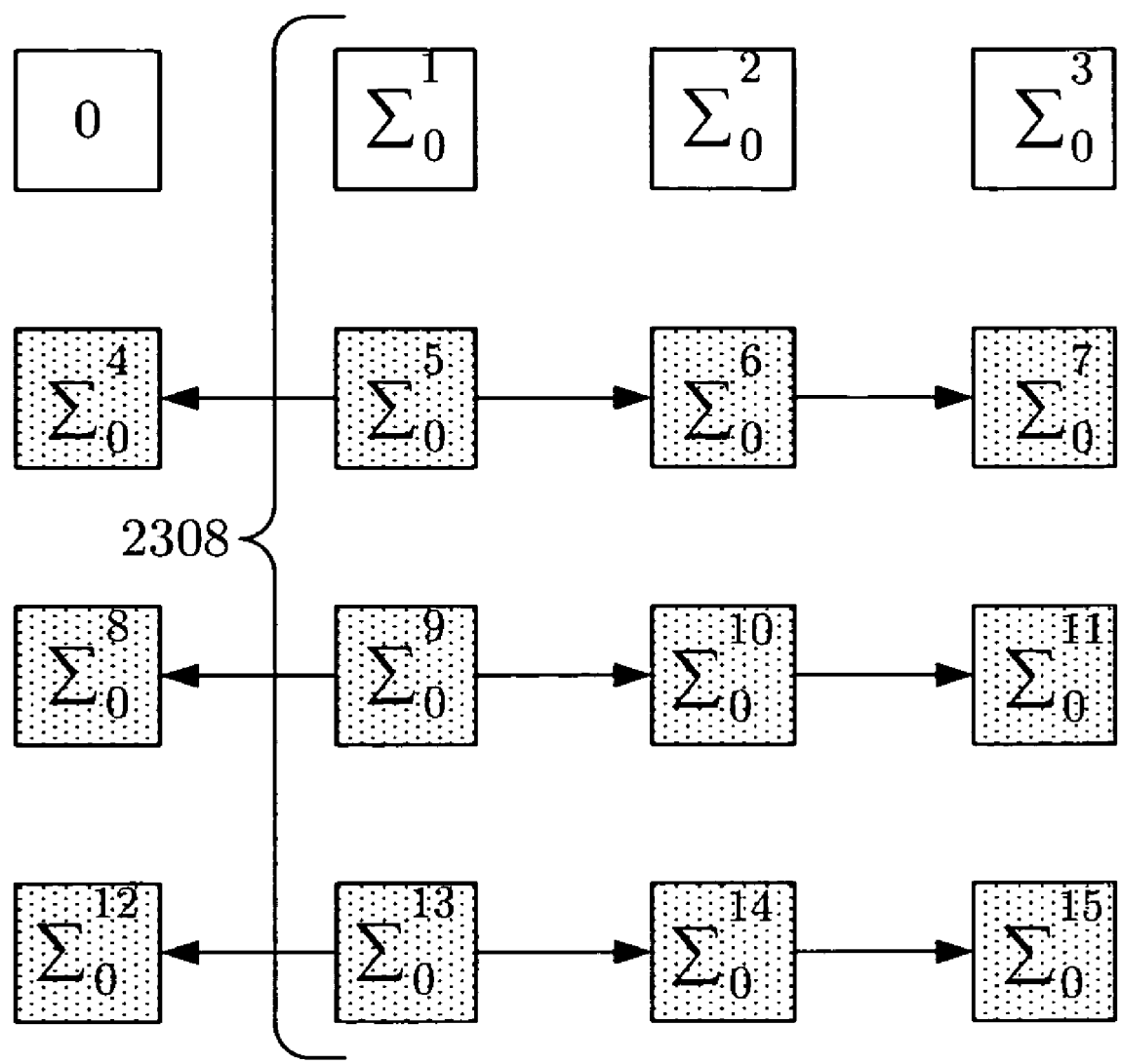
Figure 25:
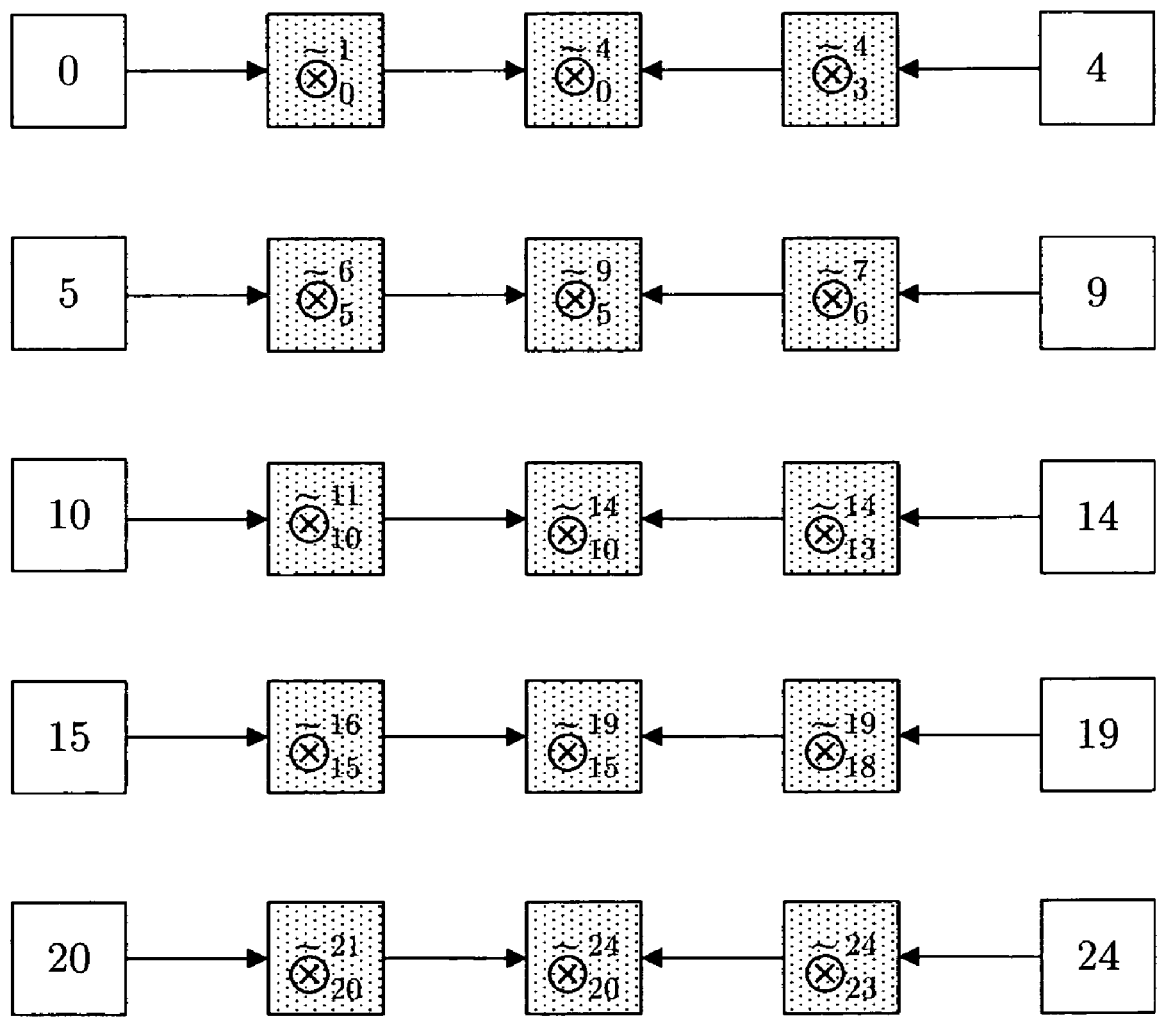
FIGS. 25-29 are diagrams illustrating phases in computing a time-optimal cyclic segmented parallel prefix operation in a mesh topology in accordance with a preferred embodiment of the present invention.

Row Update:
To complete the prefix computation, we send the partial prefix sums from each row $r-1$ to each element in the corresponding row r, from center column 2308 leftwards and rightwards. FIG. 24 illustrates the row update.

Analysis of FIGS. 21-24 reveals that both the row prefix and the row update take time $$\frac{1}{2}\Theta(\sqrt{n}),$$

respectively. Thus, for each of these phases, we gain a factor of two over the original version discussed in Section 2.1. The column prefix takes time $\Theta(\sqrt{n})$, as before. The total time of the optimized prefix computation is therefore $T=2\Theta(\sqrt{n})$. Not only is this optimized version 50% faster than our original version with $T=3\Theta(\sqrt{n})$, it is also the absolute minimum time, because it coincides with the critical path length for communicating from the top-left prefix node 0 of the mesh to the bottom-right prefix node $n-1$.

We can apply similar rearrangements of the data movements to cyclic segmented prefix circuits. Recall that our circuit design presented in Section 2.3 has a critical path length of $4\Theta(\sqrt{n})$, and requires $2n+\sqrt{n}-2$ operators. Before presenting two alternative designs, we emphasize the following lower bounds on time and the number of segmented operators:

Lower Time Bound:
The minimum time needed for a cyclic segmented prefix on a mesh is $2\Theta(\sqrt{n})$, because the input values on the opposite corner prefix nodes must be communicated to each other to compute the respective output values.

Lower Operator Bound:
The minimum number of operators for a cyclic segmented prefix on a mesh is $\Theta(2n)$, if we organize the circuit as if it were executing the cyclic prefix like two non-cyclic prefix computations.

In the following, we present two cyclic segmented prefix circuits with 2-dimensional mesh topology. The first circuit is time optimal, yet uses more operators than necessary. FIGS. 25-30 show the operational phases of this circuit and a simplified diagram of the circuit. The second circuit reduces the number of operators with a simple trick of renumbering the prefix nodes while preserving time optimality. We present the operational phases and a simplified diagram of this circuit in FIGS. 31-36.

Figure 26:
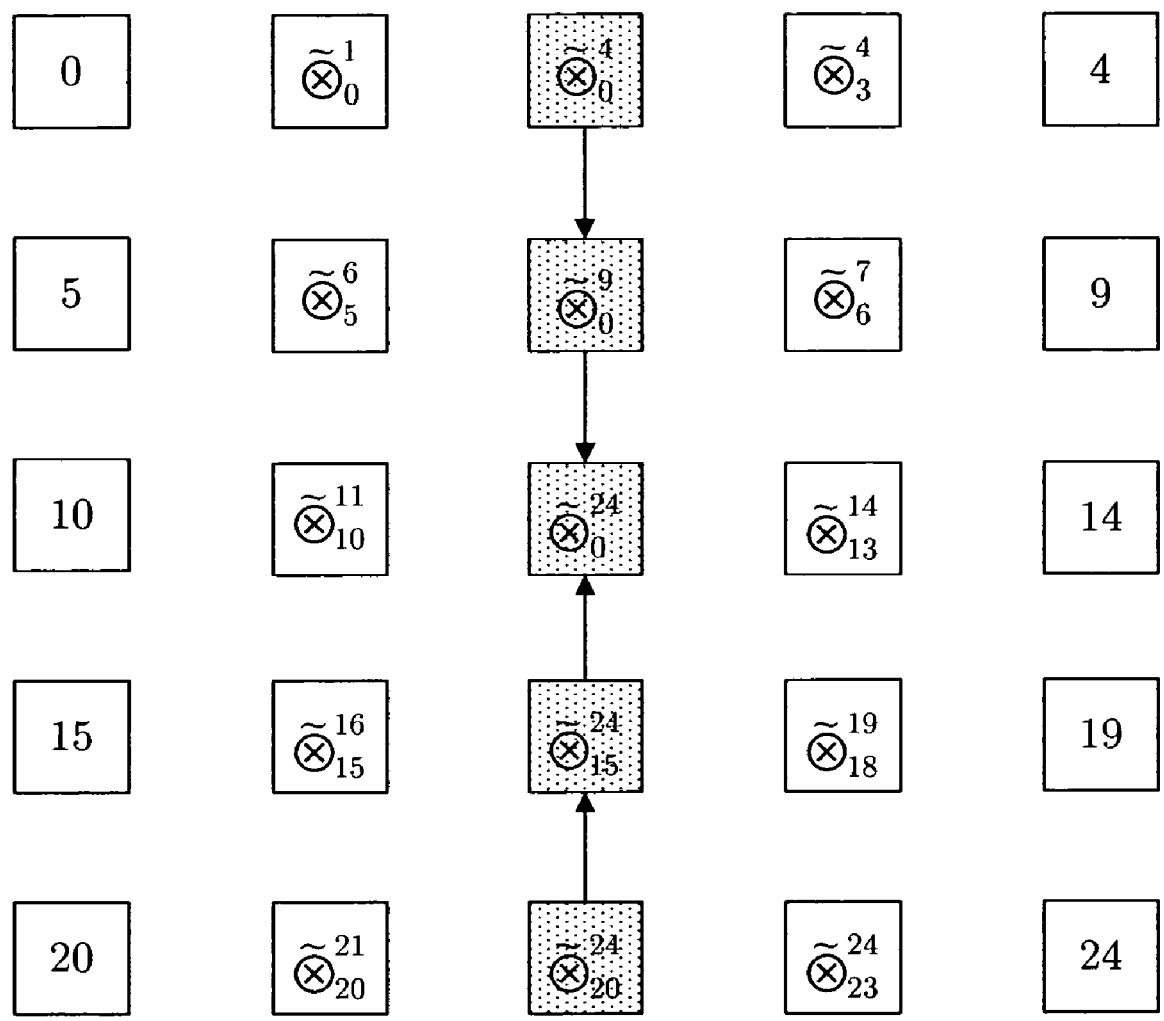

Our time-optimal circuit for a cyclic segmented prefix computation has a critical path length of $2\Theta(\sqrt{n})$, matching the lower time bound. FIGS. 25-29 separate the phases of this circuit for a 5×5 mesh as example. During phase 1 (FIG. 25), we compute a portion of the row prefix in each row, such that the value of each row prefix is available on the prefix nodes in the center column of the mesh. Then, we compute the value $\tilde{s}_0^{n-1}$ across the center column of the mesh, as shown in FIG. 26 (phase 2*a*), so that the value is available at the prefix node in the center of the mesh. In a preferred embodiment, we define the center column as column k, where either $$k = \left\lfloor \frac{\sqrt{n}-1}{2} \right\rfloor \text{ or } k = \left\lceil \frac{\sqrt{n}-1}{2} \right\rceil$$

(assuming that columns are numbered starting with zero-in terms of conventional ordinals (i.e., first, second, third, etc.), we could say that column k is the "(k+1)th" column). Phases 1 and 2*a* require $$\frac{1}{2}\Theta(\sqrt{n})$$

time steps each, counting the number of communications between neighboring prefix nodes that also represent wire delays. Next, we distribute value $\tilde{s}_0^{n-1}$ to all prefix nodes within time $\Theta(\sqrt{n})$ to meet the lower time bound.

Figure 27:
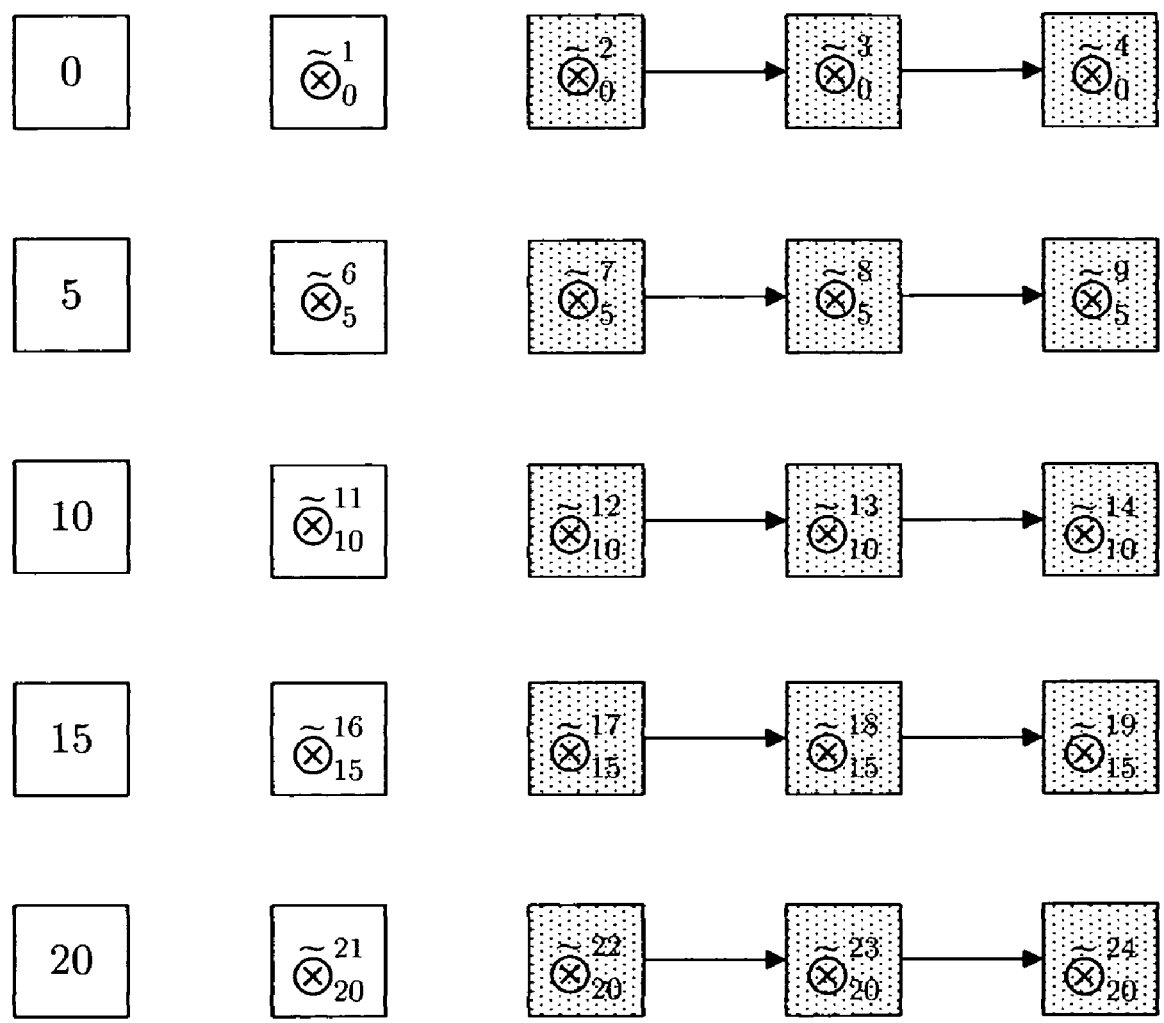
Figure 28:
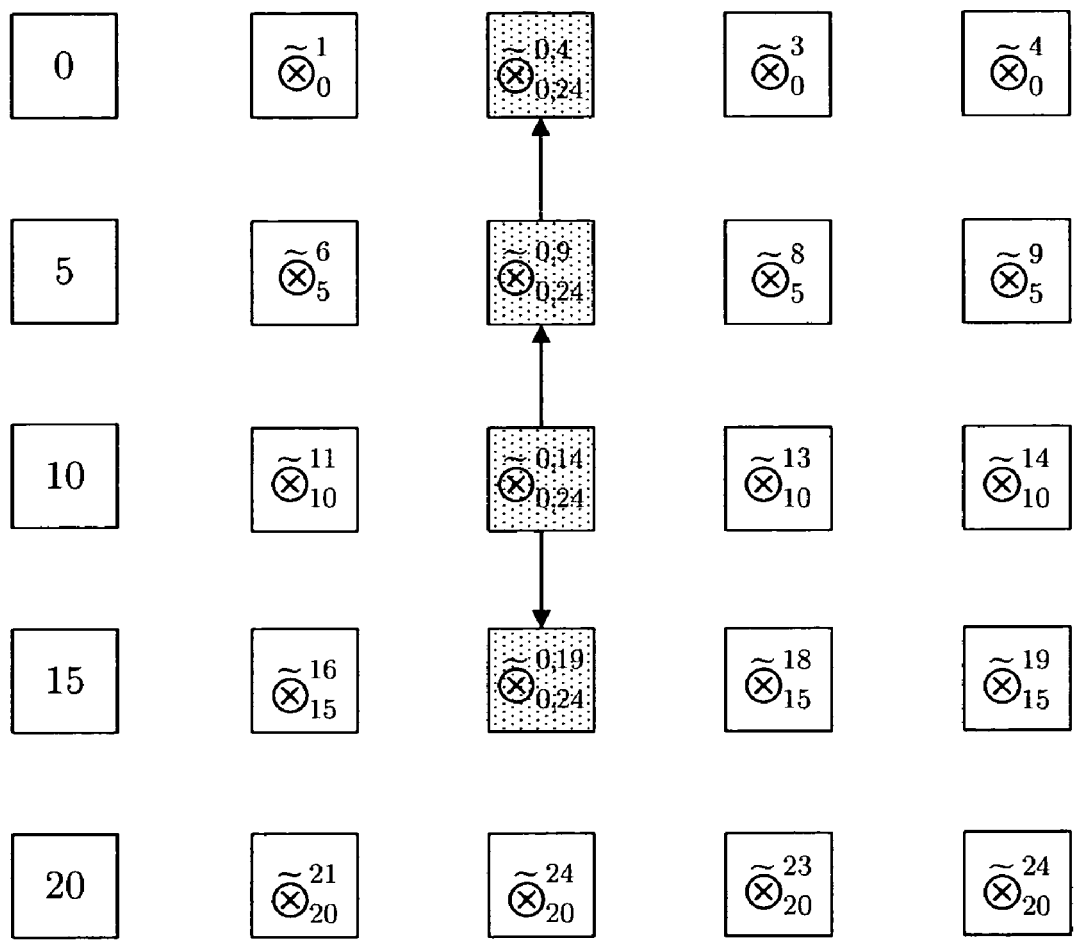
Figure 29:
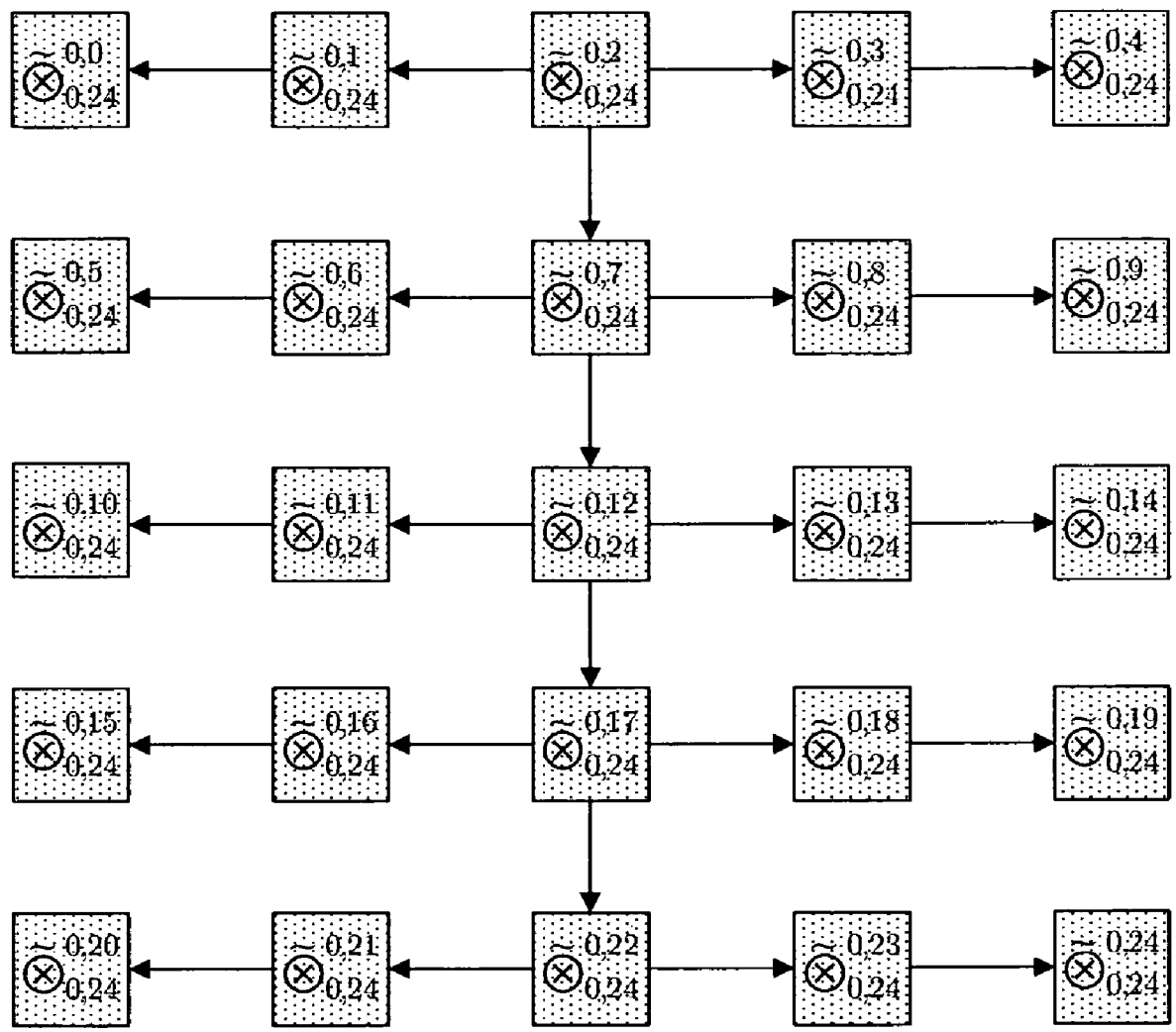

Concurrently with phase 2*a*, we complete the row prefix by extending the partial row prefix from the left half of the mesh, computed in phase 1, to the right half of the mesh. The completion of the row prefix (phase 2*b*) is shown in FIG. 27, and requires $$\frac{1}{2}\Theta(\sqrt{n})$$

time steps, just like phase 2*a*. During phases 3 and 4 (FIGS. 28 and 29, respectively), we perform the column prefix and the row update, respectively. The column prefix computes the prefix values for entire rows, including value $\tilde{s}_0^{n-1}$ as prefix, see Equation 7. Each of these values is passed from its producing prefix node in the center column to all prefix nodes in the row directly below to perform the row update. Phases 3 and 4 require $$\frac{1}{2}\Theta(\sqrt{n})$$

time steps, respectively, yielding a total of $2\Theta(\sqrt{n})$ time steps for the entire cyclic segmented prefix computation.

Figure 30:
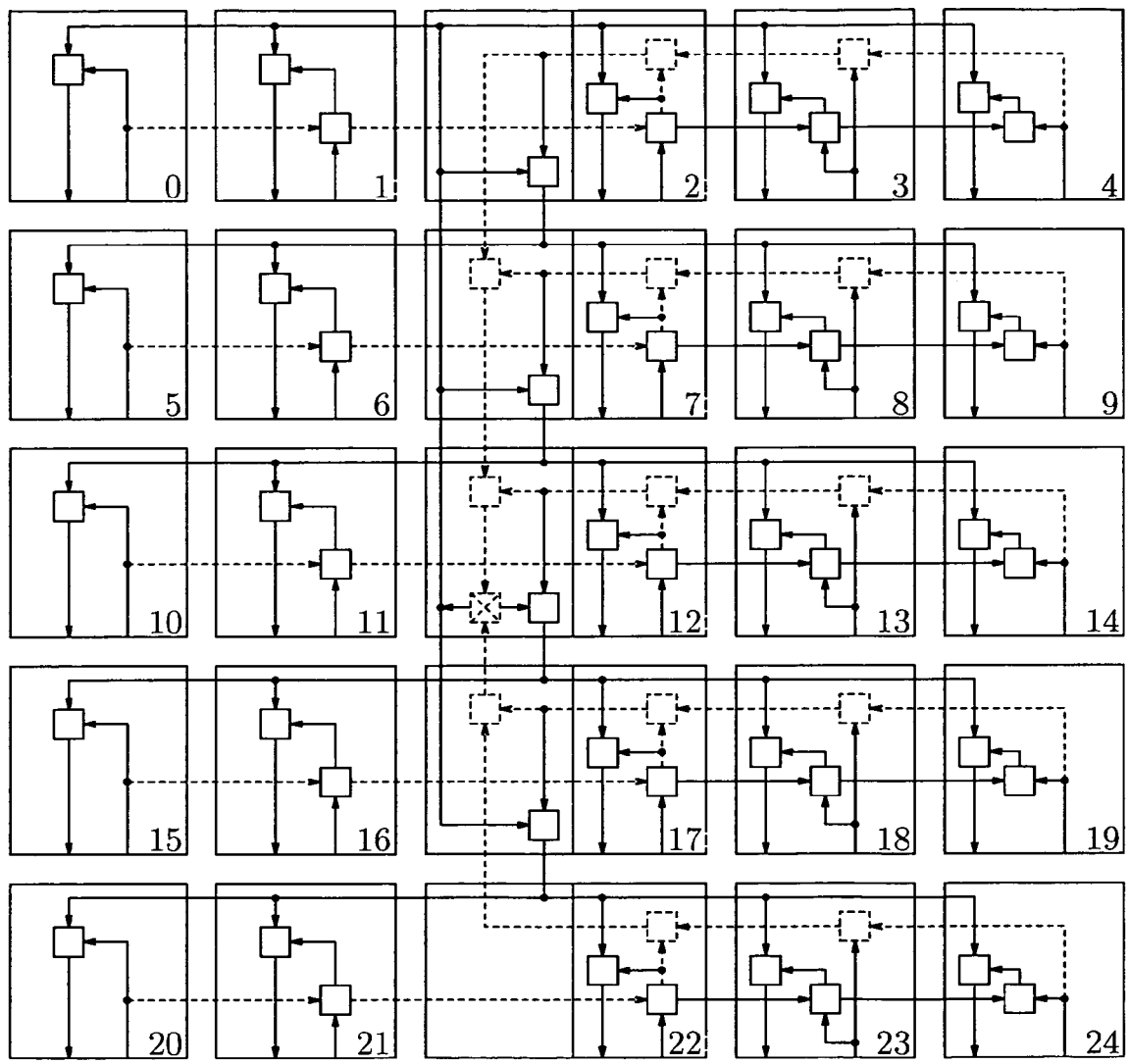
FIG. 30 is a simplified diagram of a combinational circuit for computing a time-optimal cyclic segmented parallel prefix operation in a mesh topology in accordance with a preferred embodiment of the present invention.
Figure 32:
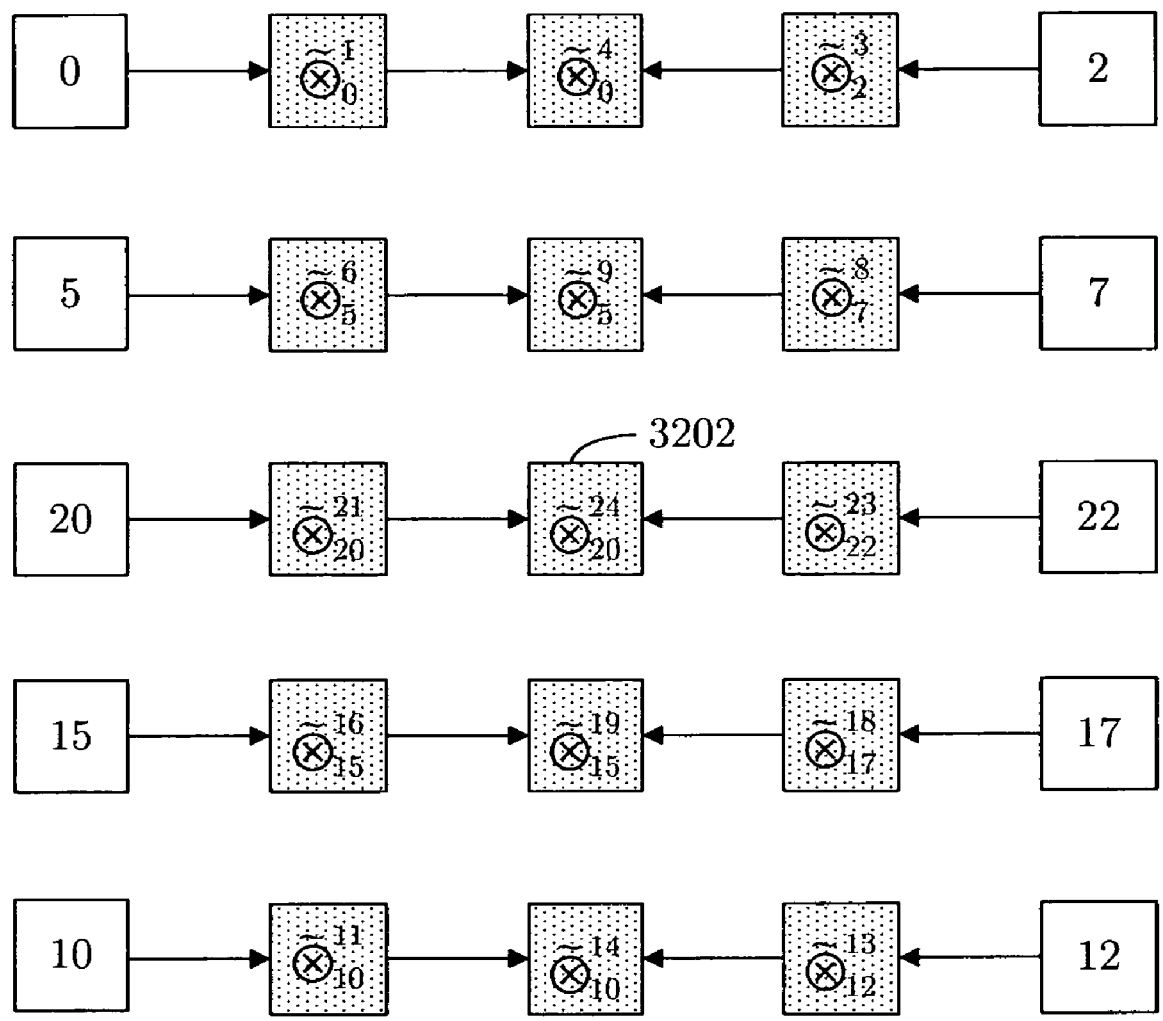
FIGS. 32-35 are diagrams illustrating phases in computing a time-optimal, wire-length-optimal cyclic segmented parallel prefix operation in a mesh topology in accordance with a preferred embodiment of the present invention.
Figure 33:
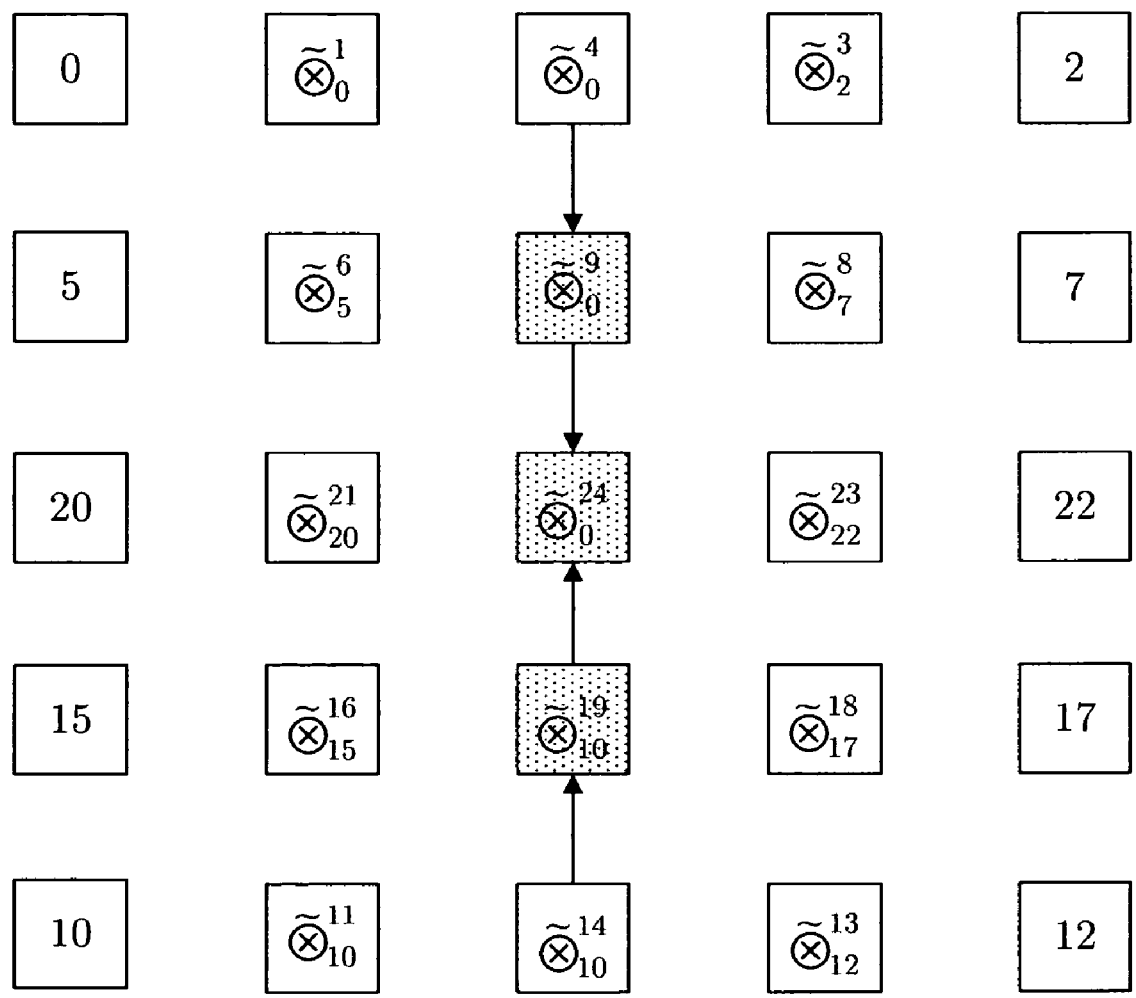
Figure 34:
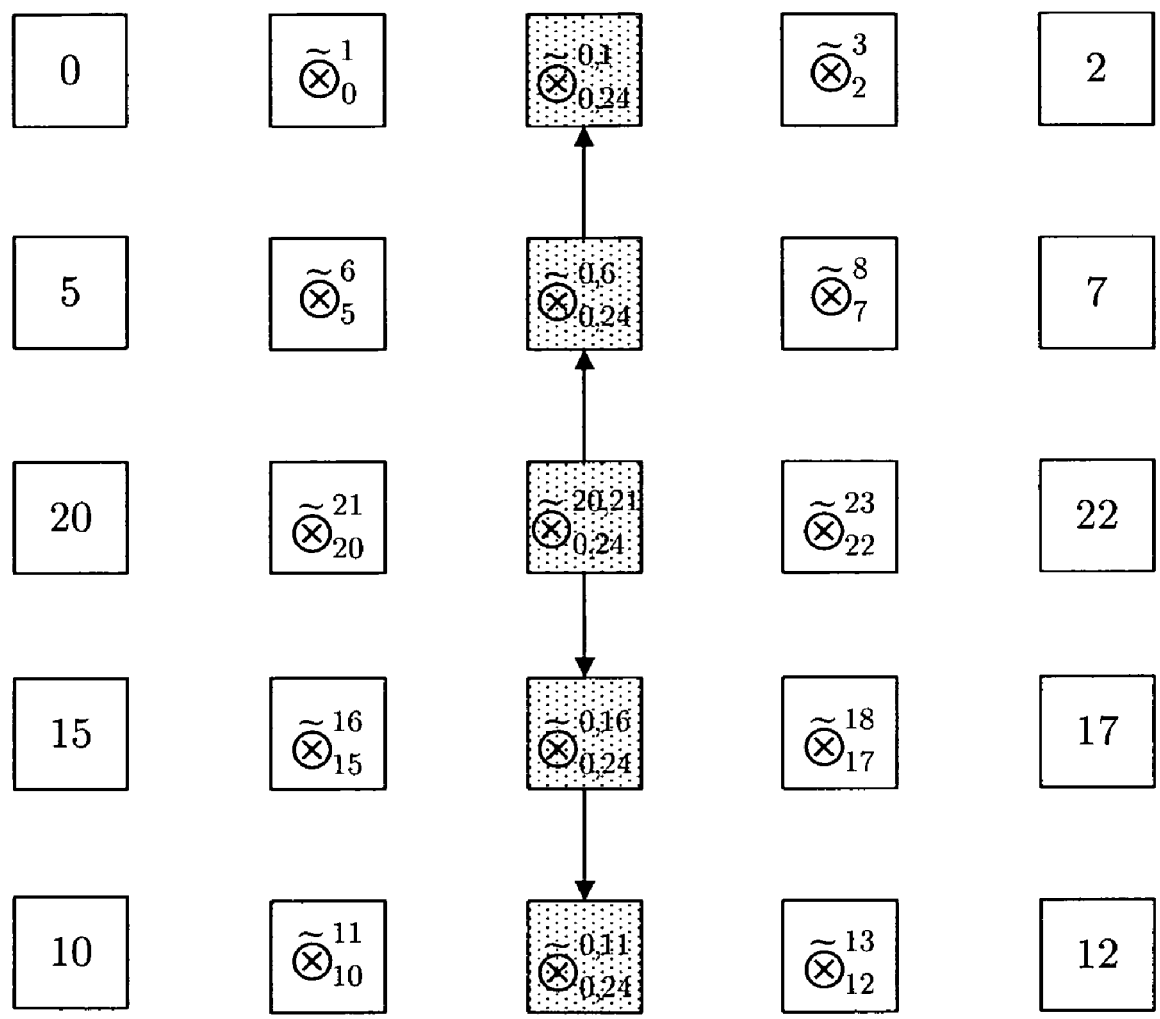

FIG. 30 provides a simplified diagram of the time-optimal circuit (simplified for reasons of printing space). Each square represents a segmented operator circuit. The dashed portions of FIG. 30 correspond to the circuitry required to compute value $\tilde{s}_0^{n-1}$ according to phases 1 and 2*a* in FIGS. 26 and 27, respectively. The remaining operators perform the completion of the row prefix, the column prefix, and the row update. It is easy to verify from FIG. 30 that the number of operators required for a $\sqrt{n} \times \sqrt{n}$ mesh is $2.5n+\sqrt{n}-2$. This number is 0.5n times larger than the asymptotic minimum of 2n for a cyclic segmented prefix circuit.

We can reduce the number of operators in the circuit of FIG. 30 if the design constraints permit renumbering the prefix nodes as shown in FIG. 31, so that prefix node n−1 occupies the center of the mesh. We can define this numbering scheme formally for all meaningful, non-trivial values of n (i.e., all n>0 that are perfect squares) by way of a function $\phi: Z_n \to Z_{\sqrt{n}} \times Z_{\sqrt{n}}$, where the notation $Z_a$ denotes the set of integers modulo a (i.e., $Z_a = \{0, 1, 2, \ldots, a-1\}$). This function $\phi(x)=(i,j)$ maps a given position in the parallel prefix (x) to a corresponding column and row in the mesh, denoted by the ordered pair (i,j). The function $\phi(x)=(i,j)$ is defined by $$i = \begin{cases} \lfloor x/\sqrt{n} \rfloor, & \text{if } \lfloor x/\sqrt{n} \rfloor < k, \\ k + \sqrt{n} - \lfloor x/\sqrt{n} \rfloor - 1, & \text{otherwise} \end{cases}$$

$$j = \begin{cases} x \bmod \sqrt{n}, & \text{if } x \bmod \sqrt{n} < k \\ k + \sqrt{n} - (x \bmod \sqrt{n}) - 1, & \text{otherwise,} \end{cases}$$

where $0 \leq x < n$, and either $$k = \left\lfloor \frac{\sqrt{n}-1}{2} \right\rfloor \text{ or } k = \left\lceil \frac{\sqrt{n}-1}{2} \right\rceil.$$

We may also introduce a $k_i$ and $k_j$, which are defined like k, but which allow us to choose to adopt the floor or ceiling (i.e., $$\left\lfloor \frac{\sqrt{n}-1}{2} \right\rfloor \text{ or } \left\lceil \frac{\sqrt{n}-1}{2} \right\rceil)$$

for the rows and columns independently.

This renumbering technique allows us to approach the lower bound on the number of operators while retaining the lower bound on the critical path length. In particular, due to the new prefix node arrangement we can complete the row prefix in phase 2*b*, because this arrangement produces the row prefixes of the right half without the (0.5n) operators that are dedicated to this purpose in the circuit of FIG. 30.

Figure 35:
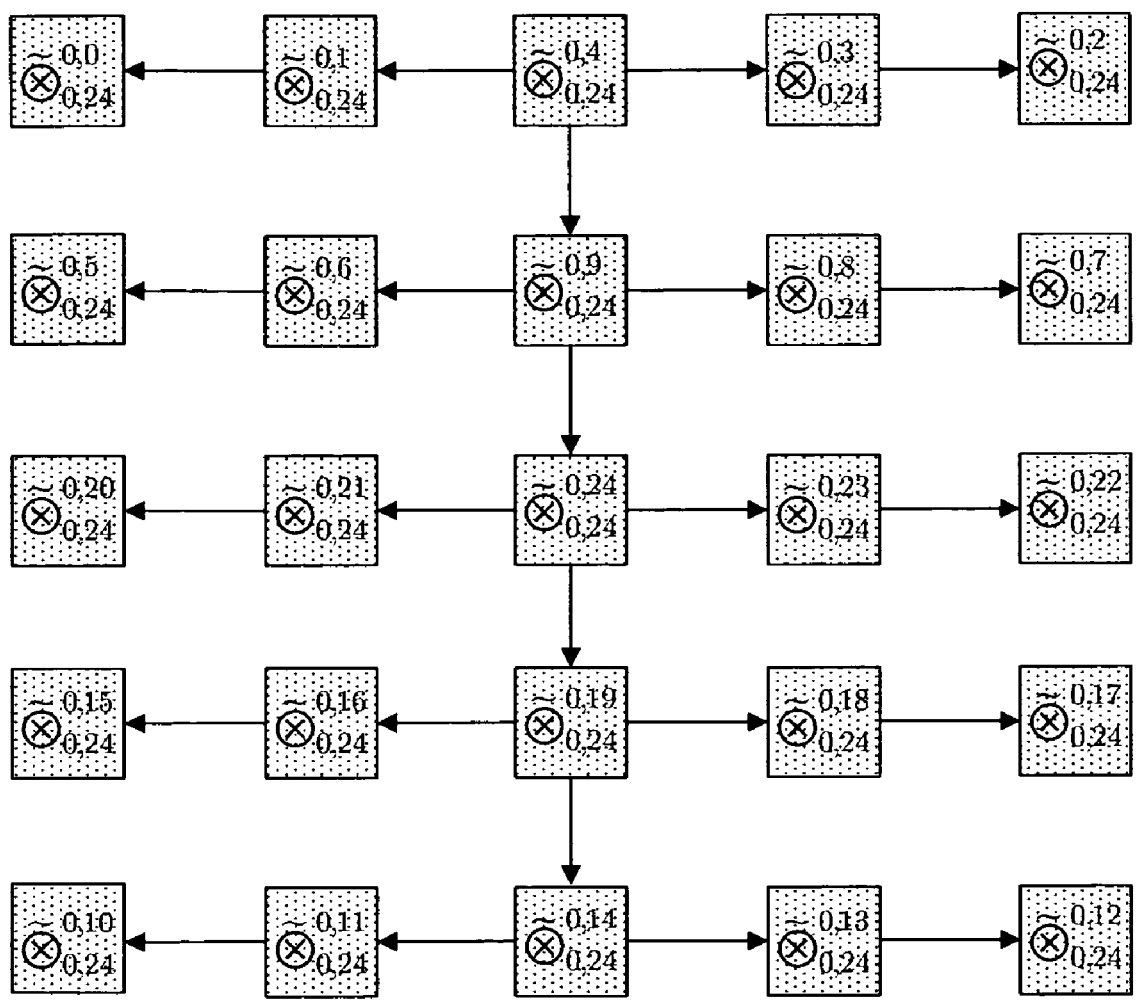

FIGS. 32-35 show the phases of this alternative circuit design for minimizing the number of operators. We compute value $\tilde{s}_0^{n-1}$ in phases 1 and 2 (FIGS. 32 and 33, respectively) on the prefix node in the center of the mesh (prefix node 3202) within $\Theta(\sqrt{n})$ time steps. In phase 3 (FIG. 34), we compute the prefix values for each row, so that we can perform the row update in phase 4 (FIG. 35). Together, phases 3 and 4 (FIGS. 34 and 35, respectively) require $\Theta(\sqrt{n})$ time steps. Thus, the space-optimized design retains the lower time bound of $2\Theta(\sqrt{n})$ time steps.

Figure 36:
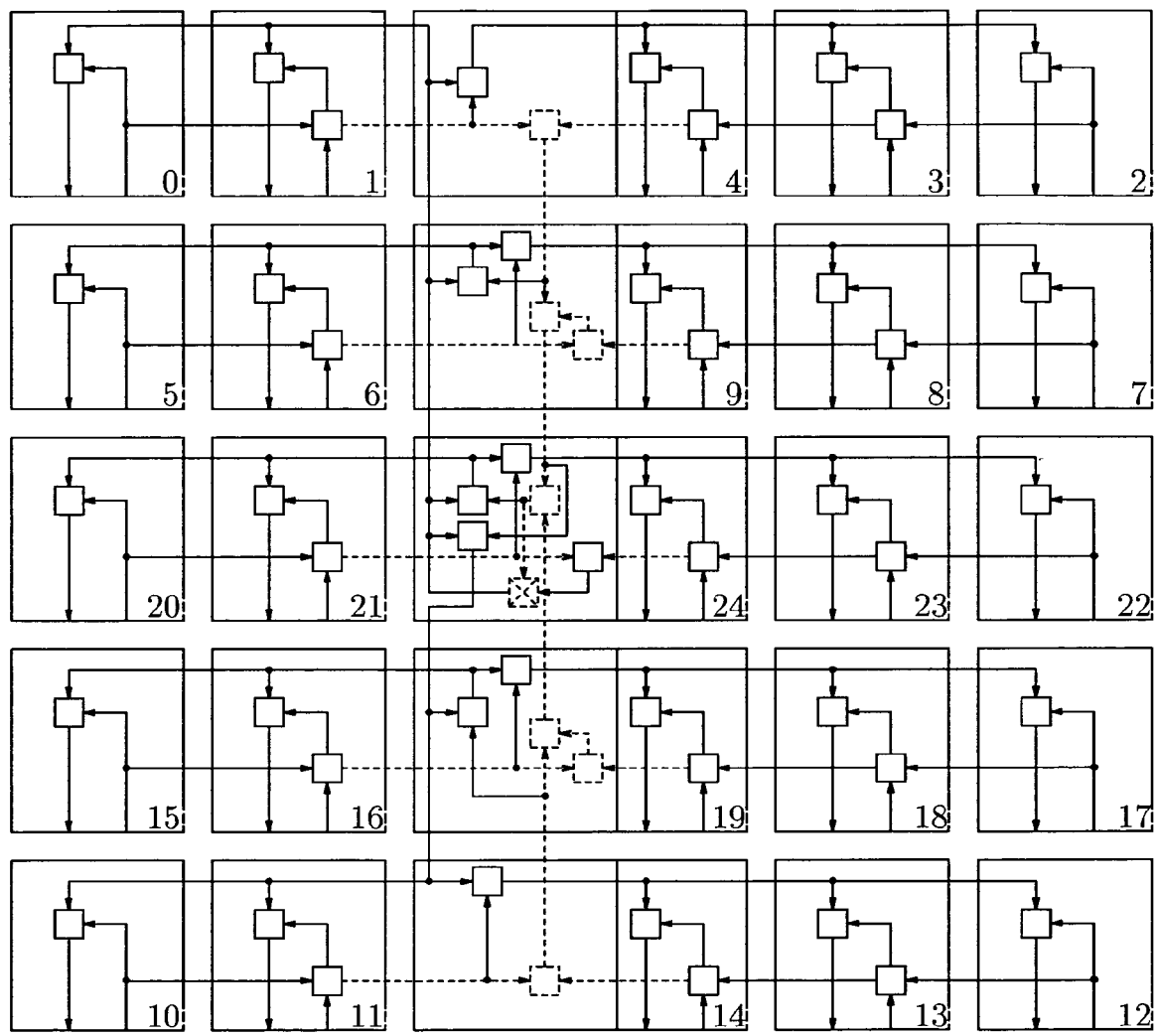
FIG. 36 is a simplified diagram of a combinational circuit for computing a time-optimal, wire-length-optimal cyclic segmented parallel prefix operation in a mesh topology in accordance with a preferred embodiment of the present invention.

FIG. 36 provides a sketch of the circuit implementing the cyclic segmented prefix computation based on the phases presented in FIGS. 32-35. The most notable difference compared to the circuit sketched in FIG. 30 is that the prefix nodes in the right half of the mesh contain two, rather than three operators. As a result, the number of operators per prefix node is limited to two, except for those prefix nodes in the leftmost and rightmost columns (which have only one operator) and the center column (which contains the operators to exchange values across rows). A straightforward count of the operators reveals that this circuit requires a total of $2n+2\sqrt{n}-2$ segmented operators, which reduces the count of the preceding design by a factor of 0.5n to the asymptotic lower bound.

3.2. Pipelining

As the problem size n of our prefix circuits grows, the critical path length may become intolerably large. We may wish to apply pipelining to increase throughput in circuits with large propagation delays.

Figure 37:
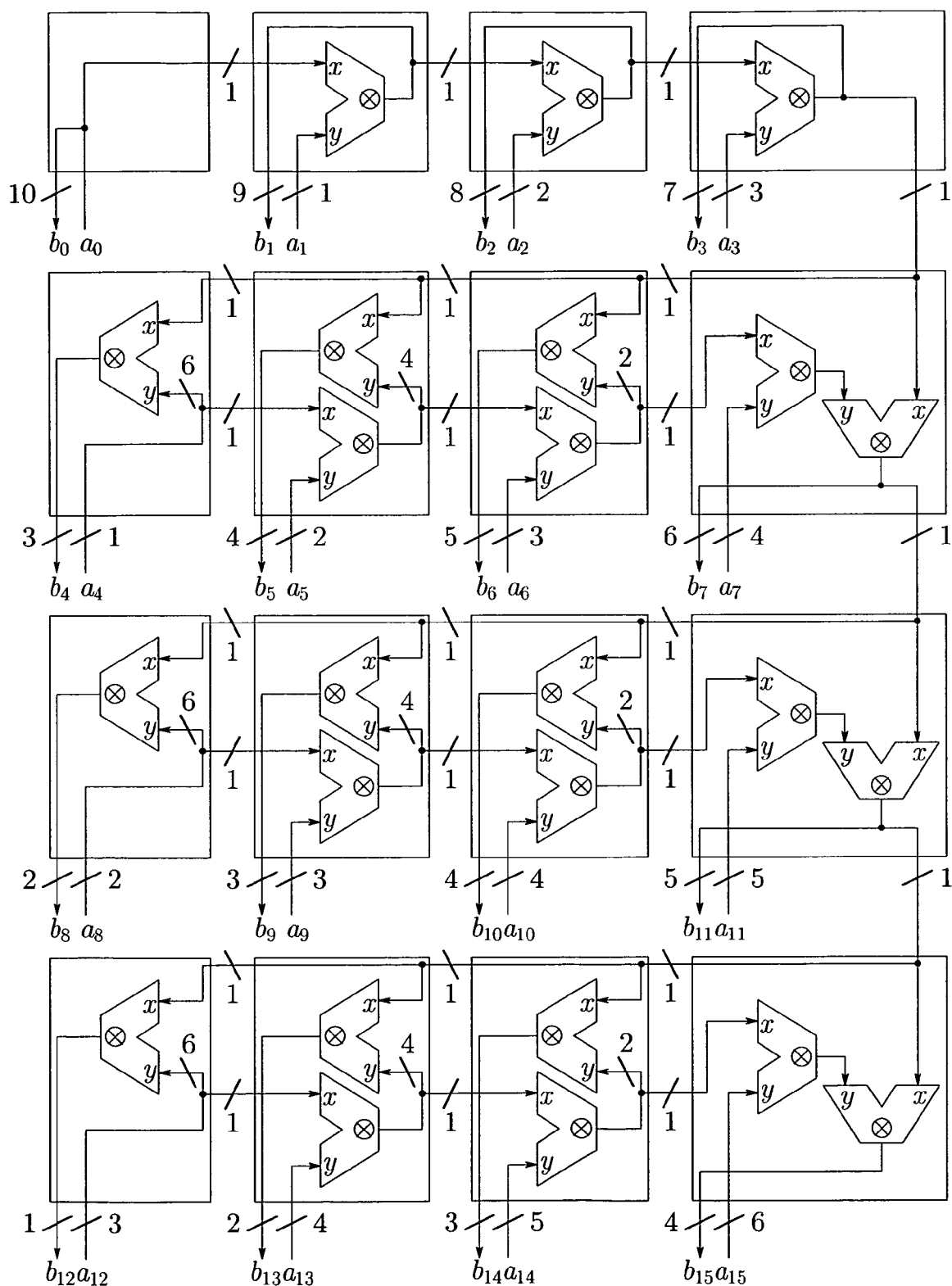
FIG. 37 is a diagram of a pipelined circuit for computing a parallel prefix operation in a mesh topology in accordance with a preferred embodiment of the present invention.

Consider a concrete example in which the delays of long wires dominate operator delays, where we want to insert pipeline registers between each of the neighboring prefix nodes of the mesh. FIG. 37 shows a pipelined version of the prefix computation discussed in Section 2.1. The critical path begins at the top-left prefix node. Then, the row prefix extends the critical path to the top-right prefix node, the column prefix to the bottom-right prefix node, and the row update to the bottom-left prefix node. Thus, the critical path length of this circuit is 10 prefix nodes, or $3\sqrt{n}-2$ for arbitrary problem size n. In FIG. 37, we show the pipelined prefix circuit with a pipeline depth of 10. Fat bars denote one or more pipeline registers in series. The number of pipeline registers is given as annotation to each fat bar.

The pipelined prefix circuit enables us to interleave multiple prefix computations. When the number of prefix computations is larger than or equal to the pipeline depth, the prefix circuit is fully utilized, and produces one prefix computation per clock cycle.

Pipelining the segmented and the cyclic segmented prefix circuits proceeds analogously to that in FIG. 37. In fact, the segmented prefix circuit of FIG. 13 can be pipelined with 10 stages as well, while the cyclic segmented prefix circuit described in FIGS. 15-18 has a longer critical path length, and requires 14 stages under the aforementioned assumptions.

As an alternative to the hardware-based implementation described above, the present invention may be implemented in the form of software for execution on a parallel computer. That is, an alternative embodiment of the present invention may be implemented in the form of a set of instructions or microcode or other functional descriptive material that may, for example, be resident in the memory (volatile or non-volatile) of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention.

Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. An apparatus comprising:
    n prefix nodes arranged in a {square root over 'n'}.times.{square root over 'n'} mesh topology,
        wherein each of the prefix nodes is configured to compute an associative operation, and
        wherein each of the prefix nodes is a combinational circuit,
    wherein each of the prefix nodes corresponds to a position in an n-element vector of values, and
    wherein the apparatus computes a cyclic parallel prefix operation by performing actions of:
        aggregating in a (k+1)th column of the mesh topology, from the n prefix nodes, partial results of applying the associative operation to values in the n-element vector, where 0<k<{square root over 'n'}−1, and wherein one of (a) k=[floor function over ({square root over 'n'}−1)/2] and (b) k=[ceiling function over ({square root over 'n'}−1)/2];
        distributing said partial results across the mesh topology from the partial results in the (k+1)th column of the mesh topology; and
        combining, at least a subset of the n prefix nodes, said partial results with additional partial results associated with the at least a subset of the n prefix nodes to obtain a result of the cyclic parallel prefix operation.

2. The apparatus of claim 1, wherein the associative operation is a segmented operator.

3. The apparatus of claim 1, wherein the n prefix nodes are arranged in row major order with respect to each location in the n-element vector.

4. The apparatus of claim 1, wherein the n prefix nodes are arranged such that a prefix node corresponding to an nth position in the n-element vector is in a (k+1)th column of the mesh topology.

5. The apparatus of claim 4, wherein the n prefix nodes are arranged such that the prefix node corresponding to the nth position in the n-element vector is in a (k+1)th row of the mesh topology.

6. The apparatus of claim 5, wherein a prefix node corresponding to an xth position in the n-element vector is in a column i and row j in accordance with a function .phi.(x)=(i,j) defined by $i$=[floor function over $x$/{square root over '$n$'}] if
    [floor function over $x$/{square root over '$n$'}]<$k$, $k$+{square root over '$n$'}−[floor function over
    $x$/{square root over '$n$'}]−1, otherwise.

$j$=$x$ mod {square root over ($n$)} if $x$ mod {square root over ($n$)}<$k$, $k$+{square root over ($n$)}−($x$ mod {square root over ($n$)})−1, otherwise.

7. The apparatus of claim 1, wherein the n prefix nodes are arranged in the mesh topology to form a combinational circuit.

8. The apparatus of claim 1, further comprising: a plurality of pipeline registers configured to store intermediate results in the mesh topology.

9. The apparatus of claim 1, wherein the associative operation is addition, multiplication, Boolean AND, or Boolean OR.

10. A method comprising:
providing n locations arranged in a {square root over 'n'}.times.{square root over 'n'} mesh topology, wherein each location corresponds to a position in an n-element vector of values, and wherein each location is a combinational circuit;
computing, by the n locations, a cyclic parallel prefix operation using an associative operation by performing actions of:
aggregating in a (k+1)th column of the mesh topology, from the n locations, partial results of applying the associative operation to values in the n-element vector, where 0<k<{square root over 'n'}−1, and wherein one of (a) k=[floor function over ({square root over 'n'}−1)/2] and (b) k=[ceiling function over ({square root over 'n'}−1)/2];
distributing said partial results across the mesh topology from the partial results in the (k+1)th column of the mesh topology; and
combining, at least a subset of the n locations, said partial results with additional partial results associated with the at least a subset of the n locations to obtain a result of the cyclic parallel prefix operation.

11. The method of claim 10, wherein the associative operation is a segmented operator.

12. The method of claim 10, wherein the n locations are arranged in row major order with respect to each location in the n-element vector.

13. The method of claim 10, wherein the n locations are arranged such that a location corresponding to an nth position in the n-element vector is in a (k+1)th column of the mesh topology.

14. The method of claim 13, wherein the n location are arranged such that the location corresponding to the nth position in the n-element vector is in a (k+1)th row of the mesh topology.

15. The method of claim 14, wherein a location corresponding to an xth position in the n-element vector is in a column i and row j in accordance with a function .phi.(x)=(i,j) defined by $i=$[floor function over $x/$ {square root over '$n$'}] if [floor function over $x/$ {square root over '$n$'}]$<k$, $k+$ {square root over '$n$'}−[floor function over $x/$ {square root over '$n$'}]−1, otherwise.

$j=x$ mod {square root over (n)} if $x$ mod {square root over (n)}$<k$, $k+$ {square root over (n)}−($x$ mod {square root over (n)})−1, otherwise.

16. A computer usable program product comprising a computer usable storage medium including computer usable code, the computer usable code comprising:
computer usable code for providing n locations arranged in a {square root over 'n'}.times. {square root over 'n'} mesh topology, location corresponds to a position in an n-element vector of values;
computer usable code for computing a cyclic parallel prefix operation using an associative operation by performing actions of:
aggregating in a (k+1)th column of the mesh topology, from the n locations, partial results of applying the associative operation to values in the n-element vector, where 0<k<{square root over 'n'}−1, and wherein one of (a) k=[floor function over ({square root over 'n'}−1)/2] and (b) k=[ceiling function over ({square root over 'n'}−1)/2];
distributing said partial results across the mesh topology from the partial results in the (k+1)th column of the mesh topology; and
combining, at least a subset of the n locations, said partial results with additional partial results associated with the at least a subset of the n locations to obtain a result of the cyclic parallel prefix operation.

\* \* \* \* \*